(12) United States Patent  
Krenzer et al.

(10) Patent No.: US 10,339,357 B2  
(45) Date of Patent: Jul. 2, 2019

(54) DEVICE AND METHOD FOR THE DIRECT RECORDING OF PRINTS OF ROLLED FINGERS

(71) Applicant: JENETRIC GmbH, Jena (DE)

(72) Inventors: Daniel Krenzer, Wutha-Farnroda (DE); Michael Fox, Remda-Teichel (DE); Joerg Reinhold, Jena (DE); Dirk Morgeneier, Jena (DE)

(73) Assignee: JENETRIC GmbH, Jena (DE)

( * ) Notice: Subject to any disclaimer, the term of this patent is extended or adjusted under 35 U.S.C. 154(b) by 107 days.

(21) Appl. No.: 15/664,202

(22) Filed: Jul. 31, 2017

(65) Prior Publication Data

US 2018/0032788 A1    Feb. 1, 2018

(30) Foreign Application Priority Data

Aug. 1, 2016 (DE) ........................ 10 2016 114 188

(51) Int. Cl.
G06K 9/00 (2006.01)

(52) U.S. Cl.
CPC ..... *G06K 9/00026* (2013.01); *G06K 9/00006* (2013.01); *G06K 9/00912* (2013.01)

(58) Field of Classification Search
CPC ........... G06K 9/00026; G06K 9/00912; G06K 9/00006
See application file for complete search history.

(56) References Cited

U.S. PATENT DOCUMENTS

| | | | |
|---|---|---|---|
| 4,394,773 A | 7/1983 | Ruell | |
| 4,553,837 A | 11/1985 | Marcus | |
| 4,783,167 A | 11/1988 | Schiller et al. | |
| 4,787,742 A | 11/1988 | Schiller et al. | |
| 4,933,976 A * | 6/1990 | Fishbine | G06K 9/00026 382/127 |
| 4,946,276 A | 8/1990 | Chilcott | |
| 5,325,442 A | 6/1994 | Knapp | |
| 5,748,766 A | 5/1998 | Maase et al. | |

(Continued)

FOREIGN PATENT DOCUMENTS

| | | |
|---|---|---|
| DE | 3622454 A1 | 1/1988 |
| DE | 19756560 A1 | 7/1999 |

(Continued)

*Primary Examiner* — John B Strege  
(74) *Attorney, Agent, or Firm* — Patentbar International, P.C.

(57) ABSTRACT

A device and method for direct recording of prints of a rolled finger provide optimal recording of rolled fingerprints by a user by visually displayed influencing of the rolling movement during the roll process. By direct recording of the rolled finger by a layer body with a sensor layer of two-dimensional matrix of sensor elements and a parallely opposite support surface on which the finger can be rolled, the distance between the sensor layer and the support surface is less than five times the mean distance between adjacent sensor elements. A light source with lighting elements that can be controlled individually or in groups to generate light portions through the support surface as visible patterns for user information with spatial and temporal reference to the rolling finger. An electronic control unit controls the light source in different areas of the support surface to generate a pattern variable over time.

19 Claims, 23 Drawing Sheets

(56) References Cited

U.S. PATENT DOCUMENTS

| | | | |
|---|---|---|---|
| 5,828,773 A * | 10/1998 | Setlak | G06K 9/0002 |
| | | | 382/126 |
| 5,956,415 A | 9/1999 | McCalley et al. | |
| 6,016,355 A | 1/2000 | Dickinson et al. | |
| 6,195,448 B1 | 2/2001 | Schiller | |
| 6,437,583 B1 | 8/2002 | Tartagni et al. | |
| 6,483,932 B1 * | 11/2002 | Martinez | G06K 9/00026 |
| | | | 283/68 |
| 6,597,802 B1 | 7/2003 | Bolle et al. | |
| 6,628,814 B1 * | 9/2003 | Shapiro | G06K 9/00013 |
| | | | 235/380 |
| 6,795,570 B1 | 9/2004 | Eichhorn et al. | |
| 7,095,880 B2 | 8/2006 | Martinez et al. | |
| 7,366,331 B2 | 4/2008 | Higuchi | |
| 7,379,570 B2 | 5/2008 | Shyu et al. | |
| 7,403,644 B2 * | 7/2008 | Bohn | G06K 9/00026 |
| | | | 382/124 |
| 7,613,334 B2 * | 11/2009 | Morgeneier | G06K 9/00026 |
| | | | 382/115 |
| 8,601,876 B2 | 12/2013 | Schneider et al. | |
| 8,693,736 B2 * | 4/2014 | Benkley | G06T 7/248 |
| | | | 382/107 |
| 8,811,688 B2 * | 8/2014 | Benkley | G06F 3/03547 |
| | | | 382/124 |
| 9,202,100 B2 | 12/2015 | Wolfer et al. | |
| 2006/0039050 A1 * | 2/2006 | Carver | G02B 5/32 |
| | | | 359/32 |
| 2008/0063244 A1 | 3/2008 | Tanaka et al. | |
| 2008/0148059 A1 * | 6/2008 | Shapiro | G06F 21/32 |
| | | | 713/186 |
| 2012/0321149 A1 | 12/2012 | Carver et al. | |

FOREIGN PATENT DOCUMENTS

| | | |
|---|---|---|
| DE | 102011117012 A1 | 2/2012 |
| DE | 102013106105 A1 | 12/2014 |
| DE | 102015110468 A1 | 2/2016 |
| EP | 2400432 A1 | 12/2011 |

* cited by examiner

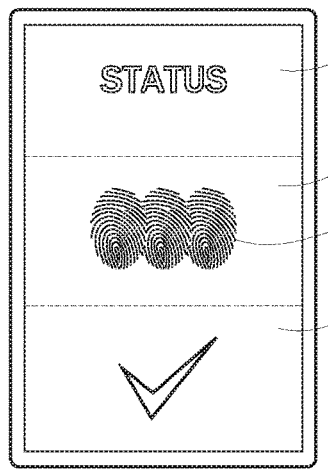
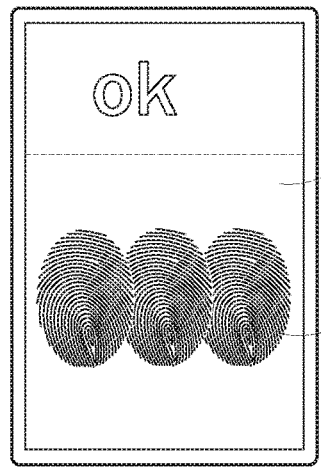
FIG 6A  FIG 6B
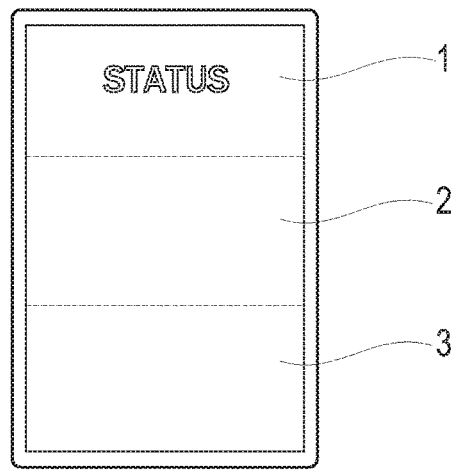
Fig. 7

DEVICE AND METHOD FOR THE DIRECT RECORDING OF PRINTS OF ROLLED FINGERS

RELATED APPLICATIONS

This application claims priority to German Patent Application No. DE 10 2016 114 188.7, filed Aug. 1, 2016, which is incorporated herein by reference in its entirety.

FIELD OF THE INVENTION

The invention is directed to a device and a method for direct recording of prints of a rolled finger with a layer body, containing a sensor layer having a two-dimensional matrix of sensor elements for detecting characteristic skin prints of the rolled finger and, as outer surface of the layer body parallely opposite the sensor layer, a support surface on which the finger can be rolled.

The invention is applied in particular in electronic recording of rolled fingerprints for police records identification and forensic identification of persons. Preferably, the electronically captured fingerprints are entered in databases of biometric features for forensic purposes and are used for identifying persons based on the comparison of biometric features.

BACKGROUND OF THE INVENTION

A concept for recording rolled fingerprints was described for the first time in U.S. Pat. No. 4,553,837 A. In this case, a device for image capture moves around the finger. This concept was optimized (U.S. Pat. No. 4,783,167 A) and alternatives with units for image capture which are likewise moved were disclosed in U.S. Pat. Nos. 4,787,742 A and 4,946,276 A.

The above-mentioned concepts have the advantage over mechanical rolling of a finger on paper that the finger need not be moved during the rolling process. With any type of rolling movement, a high-quality image capture is difficult and prone to error. Some of the image information can be invalidated and rendered unusable or irrecoverable because of too much pressure, too little pressure, slippage, incorrect or fluctuating rolling speed or changes in direction during rolling. On the other hand, arrangements such as those indicated above with moving components are maintenance-intensive and prone to equipment failure.

Further, concepts have been presented in which the finger is rolled on a support surface provided for this purpose. In this case, images are captured continuously through this support surface and suitably put together (U.S. Pat. No. 4,933,976 A). The algorithms for image composition and also the apparatus for image capture have been constantly improved (U.S. Pat. No. 6,597,802 B1, U.S. Pat. No. 6,795,570 B1, U.S. Pat. No. 7,095,880 B2, U.S. Pat. No. 7,613,334 B2). For example, a method for reducing smearing resulting from slippage during rolling was developed in U.S. Pat. No. 5,748,766 A.

There is a multitude of demands with respect to the quality, resolution and fidelity to the original of the recorded images of skin textures. Thanks in no small part to strict requirements on the part of organizations working in the field of police records such as the Federal Bureau of Investigation (FBI), for example, there is a high degree of standardization in identification systems in order to ensure the highest possible certainty of identification on the one hand and, on the other hand, to allow comparison between datasets which have been recorded by different systems. For example, such systems must have a resolution of at least 500 ppi corresponding to an average sensor element spacing of 50.8 µm. Further, contrast transfer function (CTF), signal-to-noise ratio (SNR) and distortion must comply with certain requirements. Finally, the gray value scale must include at least 200 values and the image field must be illuminated as homogeneously as possible both in the near pixel environment and in the image overall.

Currently, the optical arrangements chiefly used for acquiring rolled fingerprints which meet the high quality requirements mentioned above work on the principle of frustrated total internal reflection (FTIR—also often referred to merely as TIR). In commercially available equipment, the user is guided by information which is presented external to the support surface, e.g., by a screen mounted next to it. Accordingly, during the recording of roll fingerprints the person must always glance back and forth between the support surface and the screen.

Equipment operating by TIR has been known for decades. Its optical components and imaging beam path have been continually miniaturized as is known, e.g., from U.S. Pat. No. 7,379,570 B2.

A concept for displaying information about the scanning results or the influence of the user for improving the scan is not known in the TIR concept in connection with conventional optical imaging and is difficult to implement technologically because the display components must not be allowed to obstruct the optical beam path.

In a further development, it was attempted through alternative optical concepts without conventional imaging, i.e., without optical mirrors and/or lenses, to combine the advantage of the high image quality of the TIR principle with a compact construction. Approaches for this purpose are described in US 2012/0321149 A1. Another optical concept for a flat construction without imaging optics is described in U.S. Pat. No. 7,366,331 B2.

Besides optical sensors, capacitive sensors are also known. Recording can be implemented with different concepts in this case as is disclosed, e.g., in U.S. Pat. No. 5,325,442 A, DE 197 56 560 A1, U.S. Pat. Nos. 6,437,583 B1, 6,016,355 A and 5,956,415 A. All have in common that the capacitance of the skin is measured by way of a reference measurement at a defined capacitor, read out electronically and converted into a digital image via an analog-to-digital converter. Real-time displays of the results with instructions for correction for the user are difficult to implement.

Further, concepts also exist for acoustic recording (e.g., U.S. Pat. No. 8,601,876 B2) and piezo-electric recording (e.g., U.S. Pat. No. 4,394,773 A) of fingerprints, but they haven't been used for recording rolled fingerprints because of their resolution features and quality features.

All of the above-mentioned optical concepts without conventional imaging as well as the non-optical concepts enable layer structures of small constructional size. They are suitable for detecting flat fingerprints as well as rolled fingerprints. Thus far, however, none of these disclosed concepts allows the display of user instructions for recording a rolled fingerprint with quality control and instructions for correction directly on the support surface.

In spite of software algorithms which have been greatly improved in the interim for optimizing the individual recordings and for putting the individual images together in a suitable manner, the rolling process is still prone to error and the results of the put-together roll images often do not conform to the desired quality.

Apart from hardware of sufficient quality for image capture and software for calculating and optimizing the roll image, it is enormously important that the rolling process proceeds successfully. This means that the initial and final positioning of the finger is correct and that the rolling speed, the pressure with which the finger is pressed on the support surface and the rolling direction are as consistent as possible and are adapted to the image capture system. The optimization of the rolling process can be carried out, for example, by specially trained personnel, but this is very time-consuming and costly and is not always or everywhere possible. Therefore, it would be desirable if the equipment itself were to communicate or interact with the user in such a way that the user is guided and instructed during the rolling process so that an optimal roll image of the finger is made. Even if the equipment were used by trained personnel, a guided rolling process would represent a simplification and assistance for the personnel, e.g., for personnel who only make unevenly rolled fingerprint recordings and who, for lack of experience, would always make use of any instruction in order to prevent operating errors.

U.S. Pat. No. 9,202,100 B2 describes a concept for guiding the user in which the user is shown information about quantity and position, steadiness and correct pressing pressure of the finger via a separate display in the vicinity of the support surface. The purpose of this is primarily to inform the user of errors in the placement of single-finger prints and four-fingerprints. The concept is characterized in that a two-dimensional display unit is arranged next to the recording unit. It describes the recording of flat, i.e., not rolled, fingerprints. The object of the user guidance shown herein is the display of an image sequence in which a view of the backside of the user's positioned extremity (finger or hand) is simulated for the user. In this case, a transition from an existing error state to a desired final state is shown by means of symbolic depiction of fingers or hands. In so doing, no characters are used and no print result image is shown. It is disadvantageous that when the user is prompted to perform an action this action cannot be controlled or influenced during the process. However, this would be useful or even necessary when recording rolled fingers.

SUMMARY OF THE INVENTION

It is the object of the invention to find a novel possibility for recording rolled fingerprints which permits optimal finger rolling by the user himself/herself without trained personnel and with the most extensive possible influence on the above-mentioned critical rolling parameters during the rolling process.

In a device for the direct recording of prints of a rolled finger with a layer body, containing a sensor layer having a two-dimensional matrix of sensor elements for detecting characteristic skin prints of the rolled finger and, as outer surface of the layer body parallely opposite the sensor layer, a support surface on which the finger is rolled, the above-stated object is met according to the invention in that the distance between the sensor layer and the support surface is less than five times the mean distance between adjacent sensor elements, in that a light source is provided which has lighting elements that can be controlled individually or by groups, and visible patterns for user information with spatial and temporal reference to the rolling finger can be generated by portions of light of the light source through the support surface, and in that an electronic control unit is provided which communicates with the light source and which is controllable such that a pattern which is variable over time can be generated through the light source in different areas of the support surface.

Advisably, a sensor layer can be used whose sensor elements are sensitive to at least one physical quantity from the group including capacitance, ohmic resistance, impedance, acoustic signals, temperature and light intensity.

The lighting elements of the light source can advantageously be controlled such that displayed patterns can be changed at a refresh rate of at least one image per second.

The distance between the sensor layer and the support surface is preferably less than twice the mean distance between two adjacent sensor elements.

It has proven advisable that the sensor layer is configured such that a capture rate at which recordings of the rolled finger are read out can be set higher for a partial region of the support surface than for recordings over the entire surface.

In an advantageous embodiment of the invention, the sensor elements are photo-sensitive and the light source of the layer body is configured such that, in addition to displaying patterns for user information by means of areas of the light source which are controllable individually or in groups, an illumination pattern can be generated for homogenized illumination of the rolling finger and for minimizing the influence of ambient light during the recording of rolled fingerprints.

In this regard, the light source is preferably configured such that the rolling finger is illuminated for image capture by light of a selected wavelength region.

In a further preferred embodiment of the invention in which the sensor elements are photo-sensitive, a further light source for illuminating the rolling finger with light of a desired wavelength region is provided in addition to the light source for displaying patterns for user information and is constructed such that an illumination pattern for homogenized illumination of the rolling finger and for minimizing the influence of ambient light during the recording of rolled fingerprints can be generated by areas of the further light source which are controllable individually or in groups.

Each of the light source arrangements mentioned above can be configured alternatively as liquid crystal displays, light emitting diode displays, electroluminescence displays or quantum dot displays.

It turns out to be advantageous that the electronic control unit is connected to the sensor layer and has a computing unit for calculating an adapted inhomogeneous illumination pattern for illuminating the rolling finger and for controlling areas which are controllable individually or in groups communicates with one or more light sources for illuminating the rolling finger with the adapted inhomogeneous illumination pattern.

Further, with a method for the direct recording of prints of a rolled finger using a device with a layer body, containing a sensor layer for detecting characteristic skin prints of the rolled finger and, as outer surface of the layer body parallely opposite the sensor layer, a support surface on which the finger can be rolled and a light source having lighting elements that can be controlled individually or by groups so that portions of light of the light source can generate through the support surface visible patterns for user information with spatial and temporal reference to the rolling finger, the above-stated object is met according to the invention through the following steps:

positioning the finger of a user on the support surface, displaying a handling instruction as visible pattern for user information in at least one area of the support surface by means of controlling the lighting elements of the light source which are controllable individually or in groups such that the user is directed to carry out a rolling movement of the finger positioned on the support surface, carrying out a rolling movement of the finger of the user on the support surface in accordance with a handling instruction which changes with spatial and temporal reference to the rolling finger, outputting sensor data at the latest from the beginning and until an end of the rolling movement and storing sensor data successively outputted from the sensor layer as fingerprint recordings which are sensed at the support surface in a spatially progressive manner In an advantageous manner, the positioning of the finger by control of the lighting elements of the light source which are controllable individually or in groups is preceded by a display of a pattern for user information as handling instruction for the correct positioning and orientation of the finger on the support surface.

The results of the rolling movement of the finger are preferably displayed on the support surface as pattern for user information. In this regard, the results of the rolling movement can be imaged as current sensor recording or can be displayed as put-together fingerprint or as abstracted fingerprint.

Further, it is advantageous to define during the rolling process a desired speed of the rolling movement of the finger through an image sequence as pattern for user information directly on the support surface. In a preferred variant, a rolling direction selected by the user is recognized and facilitated by an adapted display of an animation of the rolling movement.

It turns out to be expedient when a specific image processing is carried out for generating the characteristic print image of the rolled finger from the recordings successively generated through the sensor layer, wherein at least one of the following routines is used:

redundant fingerprint information from overlapping image areas of the successively generated recordings are used to reduce noise, the least blurry or otherwise distorted fingerprint information is selected from the successively generated recordings for further processing, areas with fingerprint information from the successively generated recordings are superimposed and suitably transformed based on discovered match features, exclusively new areas of fingerprint information are added during the rolling process after recording generated for the first time via all successive generated recordings, new areas of fingerprint information are added during the rolling process after recording generated for the first time via all successive generated recordings, and existing areas are replaced by new fingerprint information of the successive generated recordings in the event that the latter comprise higher-quality recordings of the same area of fingerprint information.

As a preferred variant of the invention, the recordings which are successively generated by the sensor layer during the rolling process are analyzed for rolling errors and when errors or quality criteria which have not been met are detected visible patterns for user information are displayed to the user directly on the support surface as handling instructions.

In a particularly preferred variant of the method in which an optical recording is carried out through a photo-sensitive sensor layer, a light source for illuminating the rolling finger is controlled individually or in groups such that the rolling finger is illuminated with an adapted inhomogeneous illumination pattern to minimize the influence of ambient light and to generate a homogenized illumination of the rolling finger.

The invention is based on the fundamental consideration that conventional devices for capturing rolled fingerprints are either susceptible and expensive due to mechanically moving parts or are not, and/or not sufficiently, assisted through interactive user guidance. On the one hand, this is due to the fact that the technical possibilities of the image capture device cannot be exploited optimally because of inadequate user performance. On the other hand, known devices do not possess the technical possibilities of allowing a differentiated and, therefore, exactly fitting interactive user guidance.

In the concept according to the invention, the rolling process is conducted in an optimally interactive manner for the user in that there is provided in the area of the support surface of the finger not only the sensor for detection, but also at the same time a display system for communicating with the user. With the display system placed underneath or embedded, the rolling speed, for example, can be defined on the support surface, for example, in that an illuminated line is moved from the starting point to the end point.

A further advantage of this novel sensor/display technology consists in that the active display unit can serve simultaneously as temporally and spatially varying illumination for the finger for image capture of the rolled fingerprint in systems with optical sensor in addition to user guidance. In this case, not only is a homogeneous illumination of the entire support surface possible, but also a spatially and temporally varying illumination. For example, the above-mentioned line for defining the rolling speed can also be used additionally as a brightness profile for optimized illumination for generating images with high dynamic range (HDR). Different brightness data can be acquired from the same spatial coordinates of the finger through the roll.

Moreover, the results of the roll can be displayed directly on the locations of the support surface which become vacant when rolling during the roll process. Accordingly, rolling on a sheet of paper can be simulated for the observer/user so as to make the technology more acceptable. In addition or alternatively, the results of rolling can be displayed on the support surface in the immediate vicinity of the displayed rolling surface. Accordingly, the roll can be observed and checked. In so doing, the results can be displayed in symbols in order to communicate only the process or to display the specific print image.

In the arrangement according to the invention, the recording unit and the display unit are combined as one unit in that a light source is placed directly below the recording unit so that the user cannot perceive it as a separate unit.

BRIEF DESCRIPTION OF THE DRAWINGS

The invention will be described more fully in the following with reference to embodiment examples and accompanying drawings. The drawings show:

FIG. 6A is a preferred embodiment form for the nail-to-nail roll procedure, wherein the display shows the results and signals the end of the roll procedure;

FIG. 6B is a further preferred embodiment form for the nail-to-nail roll procedure, wherein the display shows the results in high resolution and signals the end of the roll procedure;

FIG. 7 is another preferred embodiment form for the nail-to-nail roll procedure, wherein the display shows the standby state;

SENSOR CONCEPTS

Figure 1A:
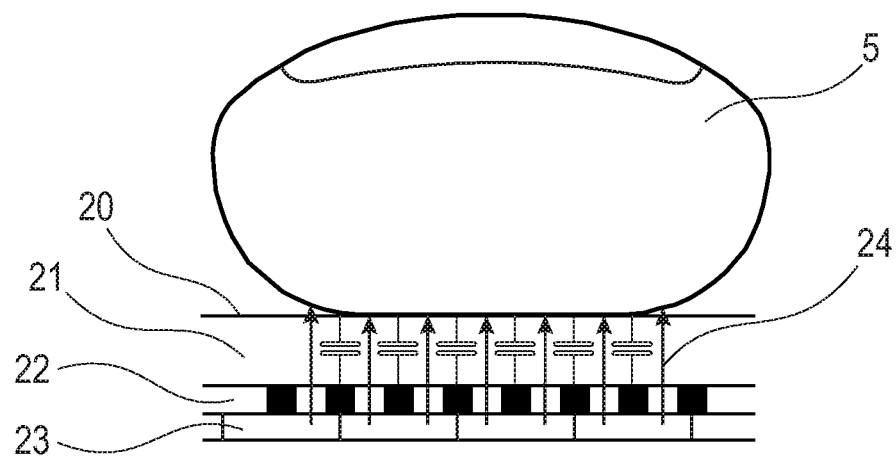
FIG. 1A a cross section of a recording device with capacitive sensor as preferred embodiment form.
Figure 2A:
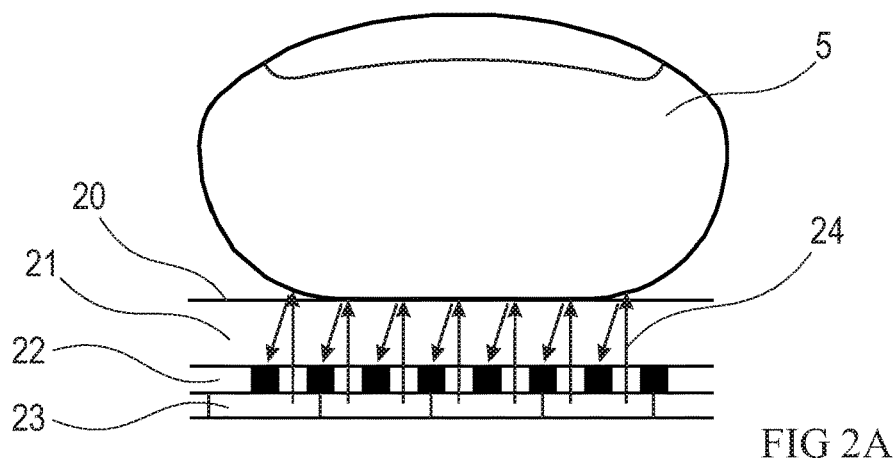
FIG. 2A is a cross section of a recording device with optical sensor as preferred embodiment form.
Figure 2B:
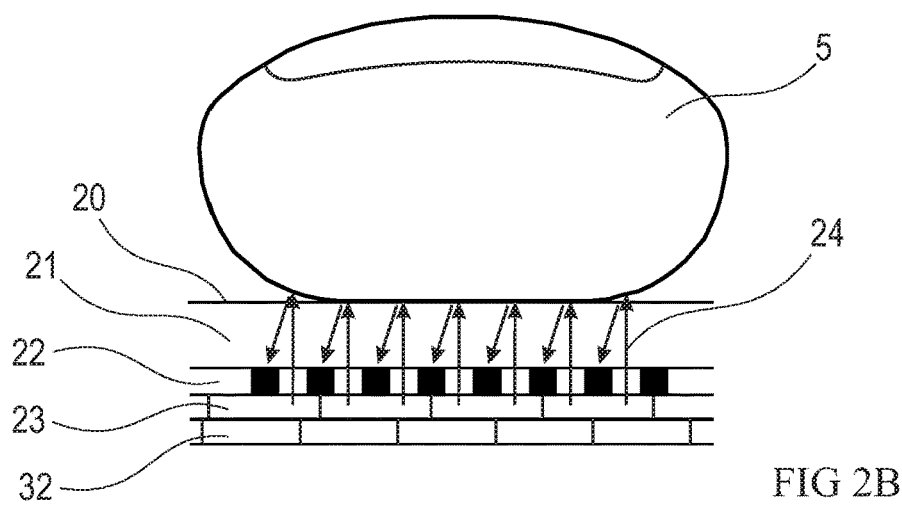
FIG. 2B is a cross section of a recording device with optical sensor and additional further light source for illumination as preferred embodiment form.
Figure 3:
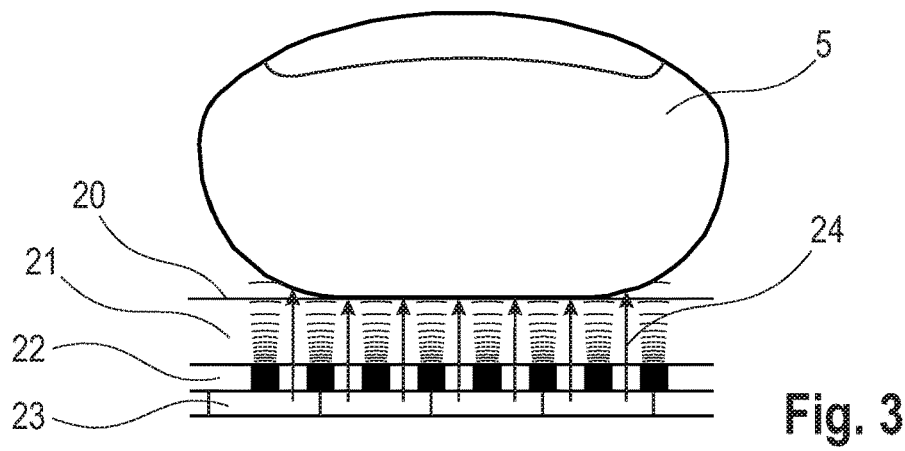
FIG. 3 is a cross section of a recording device with acoustical sensor as preferred embodiment form.

FIG. 1A, FIG. 2A and FIG. 3 show cross sections of recording devices as preferred embodiment forms. The finger 5 is in direct contact with the support surface 20. A protective layer 21 which protects the sensor from environmental influences is located between the support surface 20 and the sensor layer 22. The sensor layer 22 detects signals which contain characteristic information about the papillary lines of the positioned finger 5. This sensor layer 22 can comprise, for example, capacitance-sensitive sensor elements as is shown in FIG. 1A, optically sensitive sensor elements as is shown in FIG. 2A or acoustically sensitive sensor elements (e.g., ultrasound sensor elements) as is shown in FIG. 3. Located below the sensor layer 22 is the light source 23, which is able to emit light portions 24 through the layer system located above it so that visual information can be perceived by the user directly on the support surface 20. The light source 23 can be, for example, a TFT-LC display, LED display, quantum dot display or electroluminescent display. In recording devices with optical sensors, this light source 23 can be used both for displaying the user guidance and for illuminating the finger 5 to be rolled. In an alternative embodiment form, a further light source can also be provided in addition to light source 23 for illumination 32 of the finger 5 to be rolled as is shown in FIG. 2B. This can also be a screen, for example, such as a TFT-LC screen, LED screen, quantum dot screen or electroluminescent screen or can also be a homogeneous illumination which is realized, for example, by an optical waveguide in conjunction with LEDs or by a two-dimensional LED illumination.

Figure 1B:
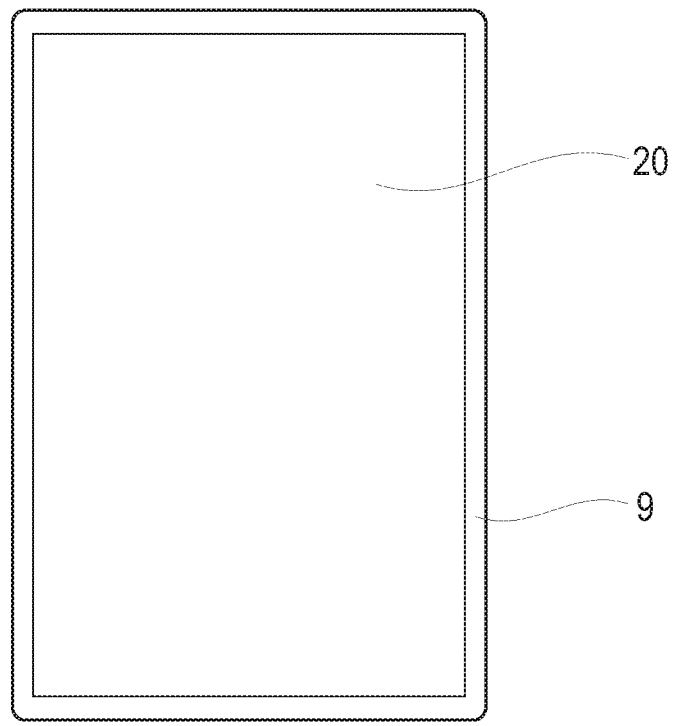
FIG. 1B is a top view of a recording device as preferred embodiment form.

The resolution of the screen should be at least 10 dpi (dots per inch) in order to display information sufficiently. The preferred resolution should be between 60 dpi and 400 dpi in order to show image information such as detailed icons for user guidance or result images 13 of the fingerprint recordings, for example. Screens with higher resolutions than 400 dpi offer no added value for the user in the intended application scenario. The refresh rate of the screen should be greater than one frame per second to allow changing handling instructions to be displayed during the rolling process. The refresh rate should preferably be between 10 and 30 frames per second so that, on the one hand, image sequences for the user guidance, e.g., a handling instruction for rolling, can be perceived by the user without troublesome jerky movements. On the other hand, refresh rates higher than 30 frames per second do not offer the user any increased benefit in the intended use scenario. FIG. 1b shows the top view of a preferred recording device with a frame 9 and the support surface 20.

User-Guided Recording of Rolled Fingerprints

Figure 15:
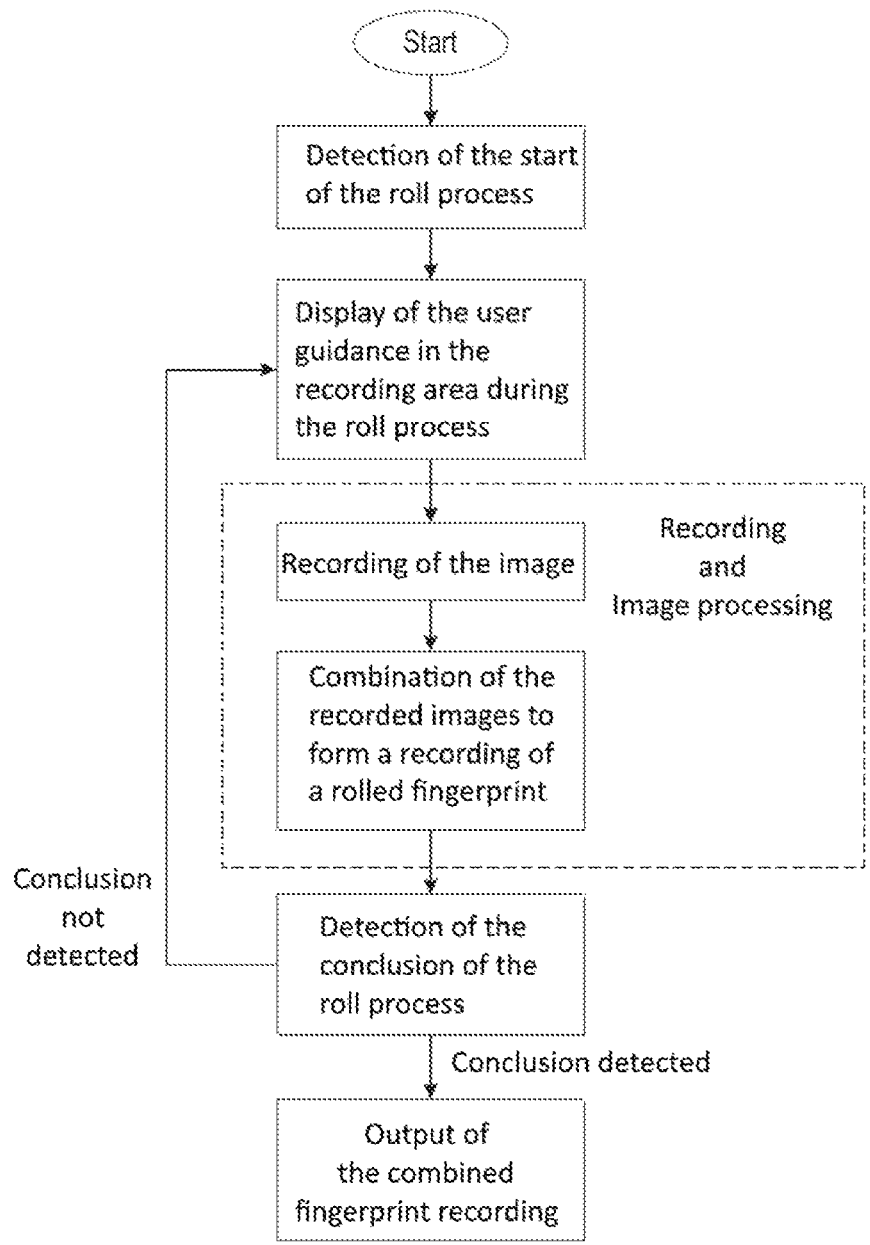
FIG. 15 is a basic flow of a method for recording rolled fingerprints with a device which displays an interactive user guidance in the sensor area for carrying out the roll process.

First, FIG. 15 shows the basic flow for recording rolled fingerprints 11 with a device which displays an interactive user guidance in the sensor area for carrying out the rolling process.

After the start of the image recording and evaluation, the start of the actual process of rolling a finger 5 placed on the sensor is detected. Within this process, recordings of the rolling area 3 are continuously made by the sensor, and it is determined through automated evaluation of these successive recordings whether or not the finger 5 is still stationary or is already rolled. In an alternative constructional variant, the start of the roll process can also be signaled manually, e.g., by means of a button on the user interface of a PC connected to the recording device.

In a basic variant, the method for recording rolled fingerprints 11 includes making one or more recordings of the rolled finger 5, storing them in a storage, processing the recordings stored in the storage and simultaneously displaying user instructions and corrections of incorrect use based on the evaluated fingerprint recordings, combining the captured individual recordings of the rolling process to form a rolled fingerprint recording and automatically evaluating the last recordings made to determine whether the roll process has been completed. If the process has not been completed, this loop is run through again starting with the updated display of the user guidance. When the end of the roll process has been detected, the completely combined print recording of the finger 5 is outputted to a downstream processing unit which is connected to the recording system via an interface. The end of the roll process can be detected by the recording device, for example, in that a certain time period has expired since the start of the rolling process or in that the finger 5 has gone past a certain rolling distance during the rolling movement. A lifting of the finger 5 from the support surface 20 or a reversal in direction of the rolling movement can also be detected as end of the rolling process.

The steps in this sequence, i.e., making one or more recordings of the rolled finger 5, storing the recordings in a storage, processing the recordings stored in the storage and combining the captured individual recordings of the rolling process to form a rolled fingerprint recording can also be summed up as image capture and processing as is shown in FIG. 15. This designation is used in FIG. 16A to FIG. 21 to facilitate the description and refers to the steps included therein.

In an alternative constructional variant, the end of the roll process can also be signaled manually, e.g., by means of a notification window on a PC which is connected to the recording system.

In an alternative constructional variant, instead of the continuous combining of individual recordings to form a roll print recording of the rolled finger 5, the combining of the rolled fingerprint 11 can also be carried out in its entirety after the roll process has been concluded.

The combining of the captured individual recordings of the rolling process to form a rolled fingerprint recording which shows the result image 13 at the conclusion of the combining process can be carried out by an image processing unit which works according to the principle presented in the above-cited U.S. Pat. No. 4,933,976 A for composing roll print images from individual fingerprint images. The roll image or roll recording is made in that one of the continuously produced recordings is used as start of the roll recording and is supplemented successively (continuously) in rolling direction by fingerprint areas from the subsequent recordings. An overlapping region in which the X coordinate at which the individual recording is added in rolling direction is determined for every image line Y is formed in each instance between the fingerprint areas from the current status of the roll recording and the last individual recording made.

In an alternative constructional variant, the combining can also be carried out in that only fingerprint areas which are contained in mutually overlapping regions in a plurality of individual recordings of the finger rolling process and which vary slightly over the course of the plurality of individual recordings are added into the roll recording. The plurality of individual recordings of the finger rolling process are preferably temporally consecutive recordings. Accordingly, effectively redundant image contents of the same image position from a plurality of images are reconciled with one another. In this way, image information from images with distortions such as artifacts due to finger movement can be suppressed in the roll image and, therefore, in the result image 13. Further, the noise contained in the individual images can be reduced for the result image 13, e.g., by averaging.

In an alternative constructional variant, the combining can also be carried out in that the image content is inserted into the roll recording for each position only from an individual recording according to certain criteria. One of these criteria can consist in that it is a fingerprint area that is in the individual image at the respective image position. A further criterion can be that when a fingerprint area has been detected at the same position in a plurality of individual recordings, the content of the recording for which a quality criterion at the respective position is most pronounced compared with the other recordings can be selected for this position. A quality criterion of this type can be that the content of the least blurry recording at this position is selected. With respect to fingerprints 11, the recording with the highest gradient intensity at the fingerprint lines can be selected as the least blurry recording. Another quality criterion can be to select the contents of that recording which at the compared position has the least amount of image distortion such as saturation of the sensor or finger lines which cannot be identified individually because of excessive finger pressing pressure. Particularly when comparing the recordings as grayscale images, further quality criteria may include a high contrast between the ridges and valleys in the fingerprint area, a large grayscale interval between the ridges and valleys, a large quantity of grayscale values taken up in the histogram of the image region or small quantity of saturated grayscale values.

In another constructional variant, the combining can also be carried out in that features are detected in the individual recordings and the same features are used in different recordings in order to combine the recordings in their overlapping area. Such features may include anatomical features of the fingerprint 11 such as minutiae or pores. By changing the shape of the finger 5 when rolling, the same fingerprint areas can be easily distorted, shifted or rotated in different recordings. Therefore, it is helpful to be oriented to anatomical features in order to determine a suitable joining line for fingerprint areas from different individual images or to transform individual images, e.g., shift them with respect to one another, beforehand or rotate or distort individual images beforehand so as to compensate for corresponding movements and deformations of the finger 5 during the recording and to overlap the anatomical features from different images in the overlapping area.

A further constructional variant can consist in that image areas from the individual recordings in the roll image which have already been recorded and transferred to the roll image are replaced again when there is a better-quality recording of the same position in the image or of the same place on the finger 5 during the continued rolling process. In order to decide whether or not the quality of the recording of the area in question is better, the above-mentioned quality criteria such as a high contrast, a large grayscale value interval between fingerprint ridges and valleys or a high gradient intensity can be used inter alia as a measure of minimal blurriness of the recording.

The user guidance displayed during the roll process is preferably carried out pictorially and it should be made as simple as possible for the user to carry out the roll process in an optimal manner and without errors. Based on a fixed time sequence, the user guidance can specify for the user what the user is to do at the appropriate time, e.g., in which direction and at what speed the finger 5 should be rolled, by constantly indicating a predetermined finger position. In an alternative constructional variant, the user guidance can also react to the roll behavior of the person by evaluating the last sensor recordings produced and can indicate, e.g., the currently detected finger position and the progress of the rolling process.

Different methods are suitable for producing the recordings of the fingerprint 11, including, inter alia, making recordings with optical sensors, capacitive sensors or acoustical sensors (ultrasound sensors), wherein an image of the recorded fingerprint 11 is formed directly or after conversion of the acquired data.

Figure 16A:
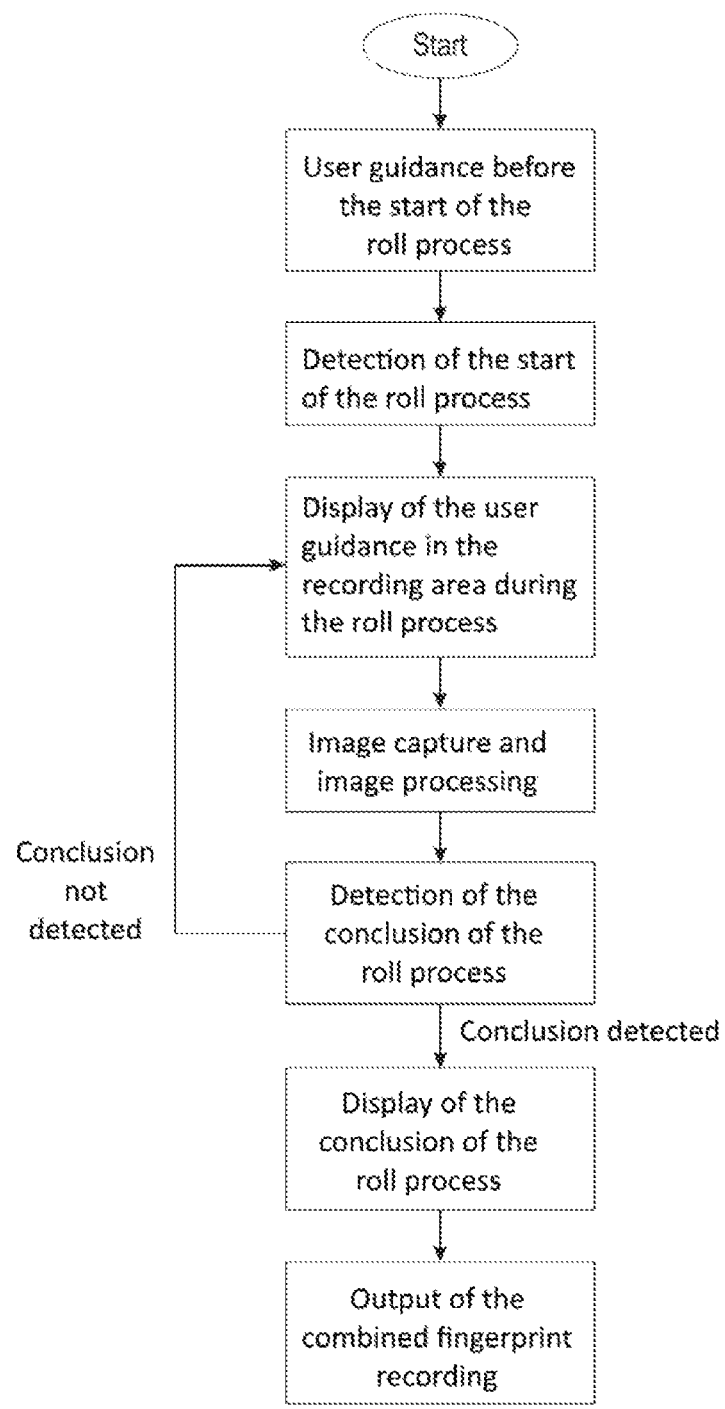
FIG. 16A is a basic flow of the method according to FIG. 15 expanded by an interactive user guidance for the process of placing the finger before the start of the actual roll process and expanded by an indication of the conclusion of the roll process.
Figure 16B:
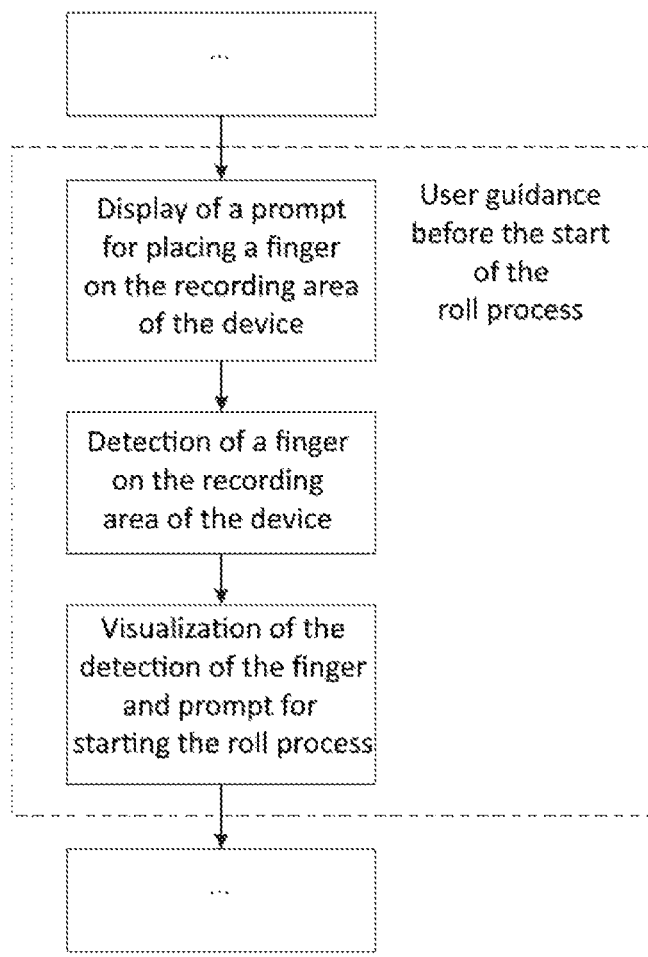
FIG. 16B is a user guidance before the start of the roll process.

FIG. 16A shows the basic flow from FIG. 15 expanded by an interactive user guidance for the process of placing the finger 5 before the start of the actual roll process. This user guidance, shown in FIG. 16A, before the start of the roll process is shown in detail in FIG. 16B. It is shown therein that a prompt is displayed for placing a finger 5 on the support surface 20 after the start of the process by graphics or animation in the sensor area. Subsequently or at the same time, an image capture and image processing is carried out for detecting whether or not a finger 5 has been placed. The detection is made up of a continuous (successive) generation of individual recordings through the sensor and the continuous evaluation of these recordings and display of the evaluation results of the individual recordings with respect to the placement status within the framework of the user guidance. Also, in FIG. 17 and FIG. 21 the user guidance before the start of the roll process refers to the steps shown in FIG. 16B.

As soon as the placement of a finger 5 has been detected, this detection is indicated in the sensor area as is shown in FIG. 16A and direction is given to start the rolling process in a determined direction. Subsequently or at the same time, the start of the rolling process is detected as was described in FIG. 15.

After the sequence and at the end of the roll process, the termination of the roll process is displayed as expansion of FIG. 15 by graphics or animation in the sensor area. This alerts the user in a definite manner that the whole process has been concluded and counteracts the user's uncertainty about spending an unnecessarily long time at the recording device because he/she is unsure about whether or not the recording is already concluded and therefore perceives the recording process as appreciably longer. The premature removal of the finger 5 from the sensor surface is also counteracted because the user need not estimate by himself or by herself the time at which the recording is finished.

In alternative constructional variants, either only the user guidance prior to the start of the roll process or only the indication of the termination of the roll process can also be carried out.

Different methods are suitable for user-guided recordings of the fingerprint 11 as is shown particularly in FIG. 15 and FIG. 16A. These methods include making recordings with optical sensors, capacitive sensors or acoustical sensors, wherein an image of the recorded fingerprint 11 is formed directly or after a conversion of the acquired data.

Figure 4A:
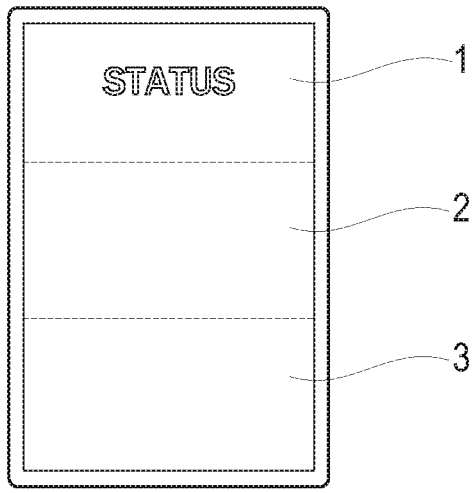
FIG. 4A is a preferred embodiment form for the nail-to-nail roll procedure, wherein the display shows the standby state.
Figure 4B:
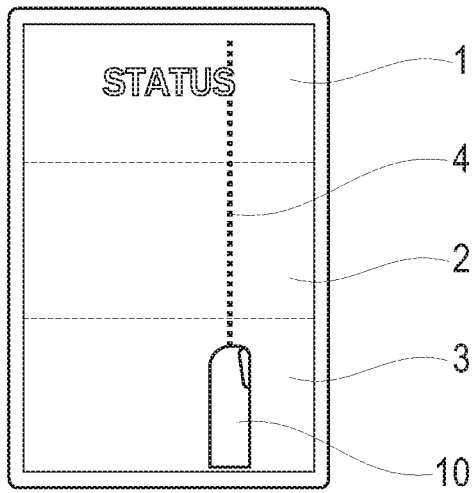
FIG. 4B is a preferred embodiment form for the nail-to-nail roll procedure, wherein the display shows a prompt for positioning the finger.

The user-guided recording of rolled fingerprints 11 will be explained in more detail in the following with respect to user guidance referring to a number of illustrations. FIG. 4A shows a device of this type for user-guided recording of rolled fingerprints 11 by way of example. The combined sensor area/display area of the recording device is divided into the status area 1 which displays, among other things, handling instructions for the roll process sequence or correction instructions or detects the latter for inputs, the result area 2 which displays the progress or the results of the recording process in a stylized manner or in the form of recorded image information, and the roll area 3 in which information for user guidance is displayed and recordings of the finger 5 are made. These areas can be positioned arbitrarily within the combined sensor/display area of the recording device and, in other embodiment examples, can also have a different size or position within this area. As is shown in FIG. 4B, a prompt for placing a finger 5 in a specific orientation at a specific location on the support surface 20 is displayed at the start of the process by graphics or animation in the roll area 3. In this instance, the finger 5 is to be positioned in the right-hand portion of the roll area 3 so as to lie on its right side as is shown by the side finger silhouette 10.

Figure 5A:
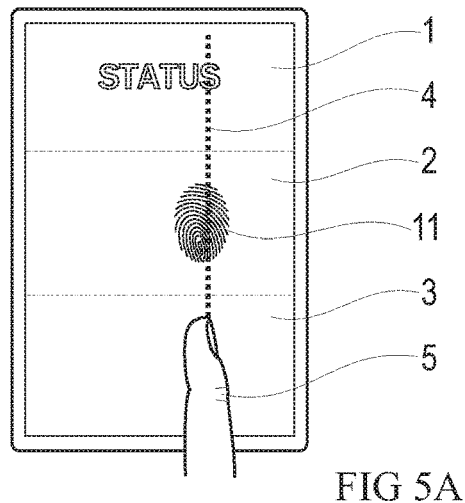
FIG. 5A is a preferred embodiment form for the nail-to-nail roll procedure, wherein the display shows the first phase of the rolling process interactively.
Figure 5B:
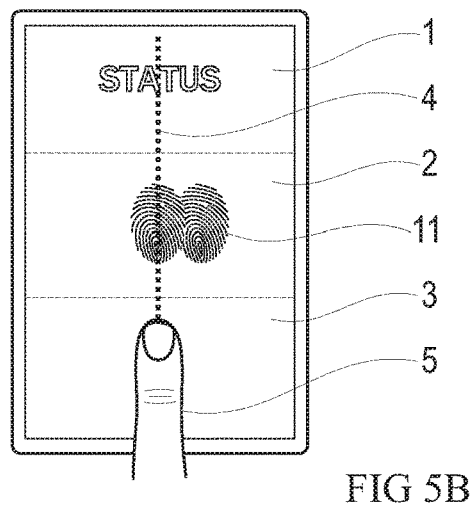
FIG. 5B is a preferred embodiment form for the nail-to-nail roll procedure, wherein the display shows the middle phase of the rolling process interactively.
Figure 5C:
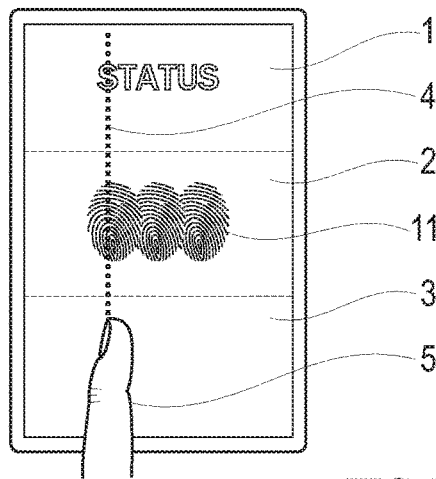
FIG. 5C is a preferred embodiment form for the nail-to-nail roll procedure, wherein the display shows the final phase of the rolling process interactively.

After the start of the roll process, the progress of the roll process can be displayed, as is shown in FIG. 5A, FIG. 5B and FIG. 5C, through fingerprints 11 that are actually outputted or through abstracted fingerprints 11. FIG. 5A shows the beginning of the roll process with the finger 5 to be rolled, which finger 5 lies on its right side in the right-hand portion of the roll area 3 and with the small portion of the rolled fingerprint 11 that has been recorded up to this point. In this example, a position indicator 4 is displayed as handling instruction in the form of a simple line for indicating the required change in position of the rolling axis of the finger 5 during the roll process in order to assist the rolling movement, in particular the speed at which the finger 5 is rolled. The continual progress of the position indicator 4 lateral to the finger 5 can be seen by viewing the three parts of the illustration in FIGS. 5A, 5B and 5C in conjunction.

Accordingly, FIG. 5B shows the finger 5 fleshy side down about halfway through the rolling process and the majority of the rolled fingerprint 11 which is already put together from more than one image. Finally, FIG. 5C shows the virtually completed (rolled) finger 5 lying on its left side in the left-hand portion of the roll area 3 and the virtually completely combined (rolled) fingerprint 11 composed of the preceding individual recordings.

To signal the conclusion of the recording process in a definitive manner, the completely combined (put-together, rolled) fingerprint 11, for example, can be displayed in the result area 2 together with a graphic indicating the conclusion of the recording process in the roll area 3 as is shown in FIG. 6A. In an alternative embodiment example, the corresponding graphic can also be displayed in the status area 1 instead of in the roll area 3. In a further embodiment example which is shown in FIG. 6B, a high-resolution result image 13 can also be displayed in a large result area 12 after the conclusion of the roll process.

In another embodiment example for a user-guided recording process for a rolled fingerprint 11, the process can also be started, e.g., without specifying the finger placement position before the start of the roll process as is shown in FIG. 7, and the position of the finger can be freely selected by the user and then automatically detected as the finger start position for the rolling process.

Figure 8A:
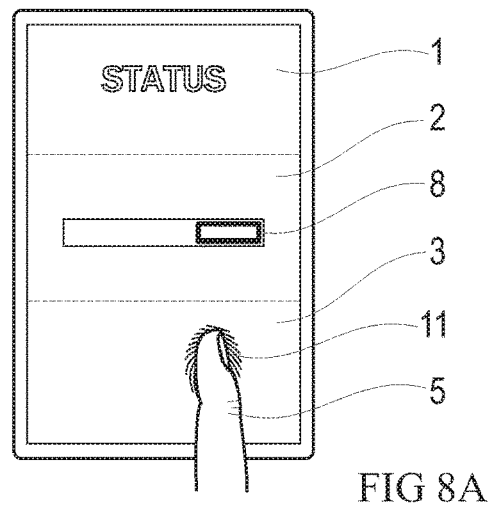
FIG. 8A is the arrangement of the invention according to FIG. 7 with another way of showing a prompt for positioning and rolling the finger from nail to nail, wherein the display shows the first phase of the rolling process interactively and the rolled impression of the finger is displayed interactively in the roll area as "ink on paper"
Figure 8B:
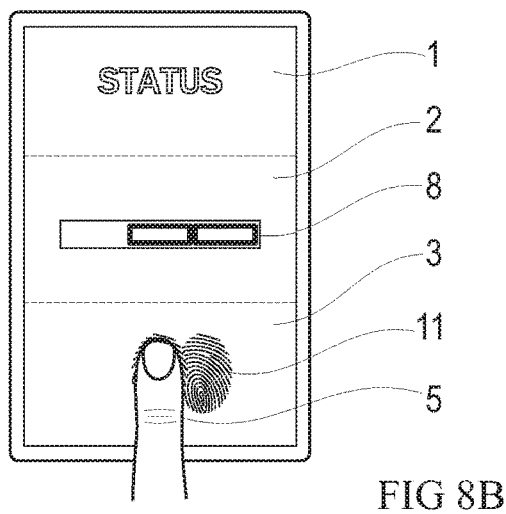
FIG. 8B is the embodiment of the invention according to FIG. 7 with another way of displaying a prompt for placement and rolling of the finger from nail to nail, wherein the display shows the middle phase of the rolling process interactively and the rolled impression of the finger is displayed interactively in the roll area as "ink on paper"
Figure 8C:
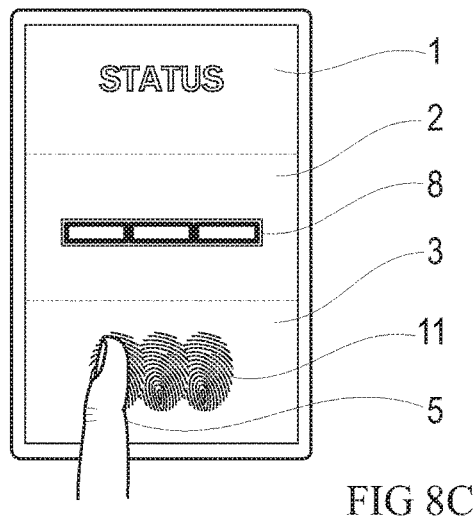
FIG. 8C is the embodiment of the invention according to FIG. 7 with another way of displaying a prompt for placement and rolling of the finger from nail to nail, wherein the display shows the final phase of the rolling process interactively and the rolled impression of the finger is displayed interactively in the roll area as "ink on paper"
Figure 9A:
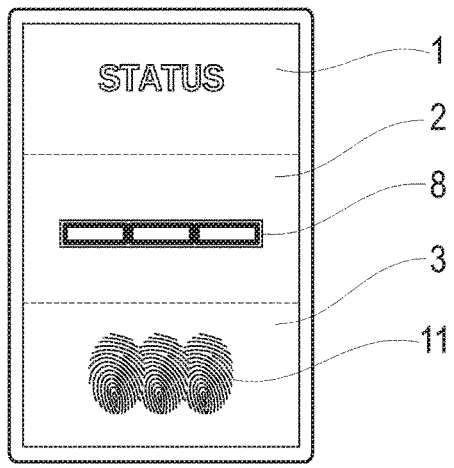
FIG. 9A is the embodiment of the invention according to FIG. 7 with a further display of the results and indication of the end of the roll procedure.
Figure 9B:
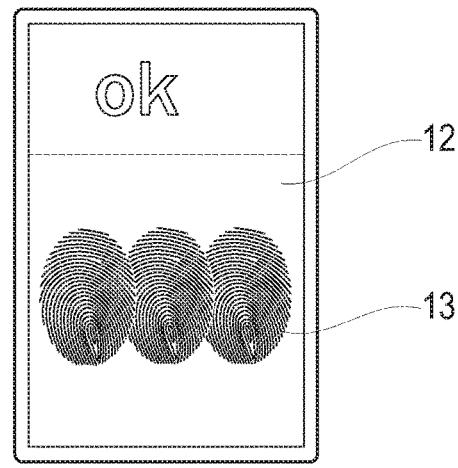
FIG. 9B is another preferred embodiment form for the nail-to-nail roll procedure, wherein the display shows the results in high resolution and signals the end of the roll procedure.

In a further embodiment example, the fingerprint image which has already actually been recorded and put together can be displayed continuously directly under the rolling finger 5 over the course of the rolling process as is shown in FIG. 8A, FIG. 8B and FIG. 8C. This has the advantage that the process unfolds like the recording of rolled fingerprints 11 on paper because the fingerprint 11 emerges directly under the finger 5. This can make it easier for persons accustomed to fingerprinting on paper to convert to the use of an electronic recording device and can facilitate the production of good-quality fingerprint recordings. In this and other embodiment examples, the progress of the roll process can be made visible, e.g., in the result area 2, by a progress indicator 8 in the immediate vicinity of the rolling finger 5. The conclusion of the rolling process can be indicated, e.g., as is shown in FIG. 9A, by a completely filled progress indicator 8 in the result area 2 and by the display of the completely recorded, rolled (assembled, rolled) fingerprint 11 in the roll area 3. Subsequently or alternatively, a high-resolution result image 13 can also be indicated in a large result area 12 as is shown in FIG. 9B.

Figure 10A:
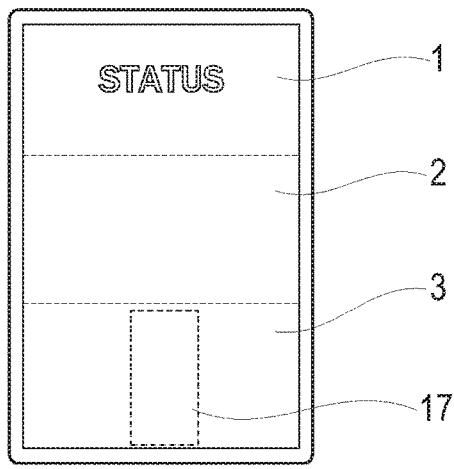
FIG. 10A is a further embodiment example of the invention with a user-guided recording of a rolled fingerprint by means of rolling the finger left and right (rock'n'roll)
Figure 10B:
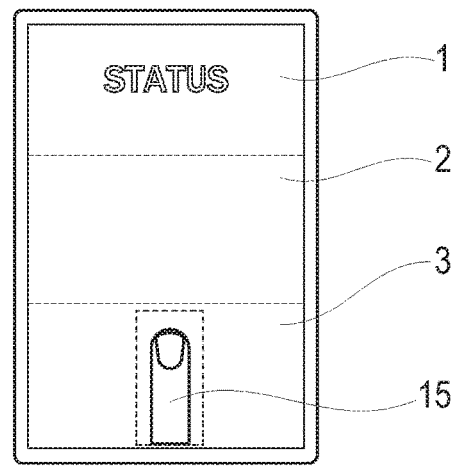
FIG. 10B is a further embodiment example of the invention with user-guided recording of a rolled fingerprint by means of rolling the finger left and right (rock'n'roll)
Figure 11A:
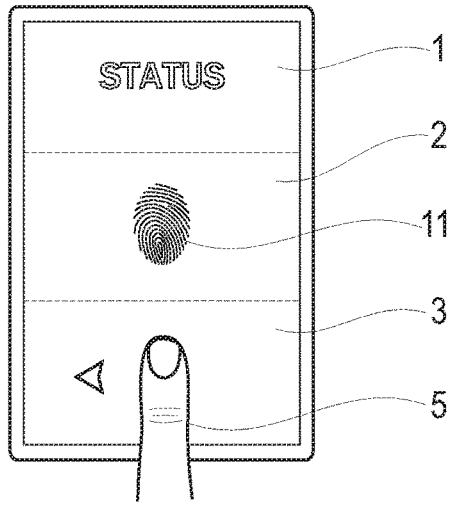
FIG. 11A is the embodiment of the invention according to FIG. 10a and FIG. 10b with another way of displaying a prompt for placement and rolling of the finger.
Figure 11B:
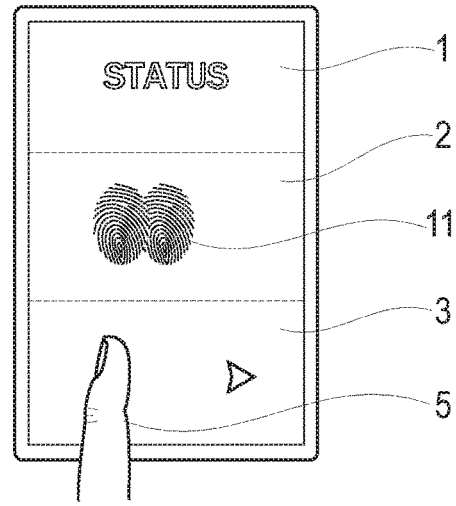
FIG. 11B is the embodiment of the invention according to FIG. 10a and FIG. 10b with another way of displaying a prompt for placement and rolling of the finger.
Figure 11C:
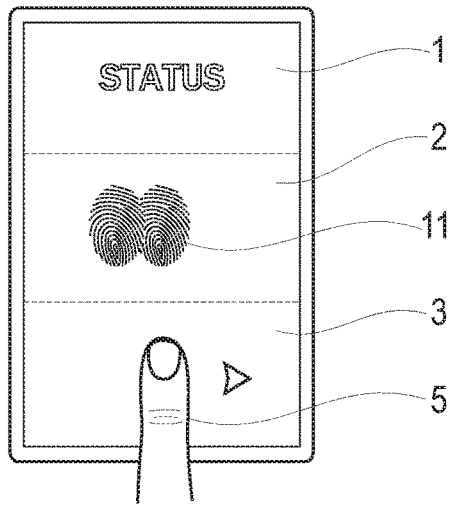
FIG. 11C is the embodiment of the invention according to FIG. 10a and FIG. 10b with another way of displaying a prompt for placement and rolling of the finger.
Figure 11D:
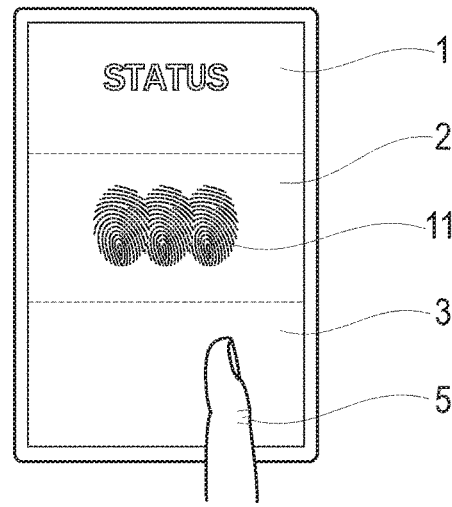
FIG. 11D is the embodiment of the invention according to FIG. 10a and FIG. 10b with another way of displaying a prompt for placement and rolling of the finger.
Figure 12A:
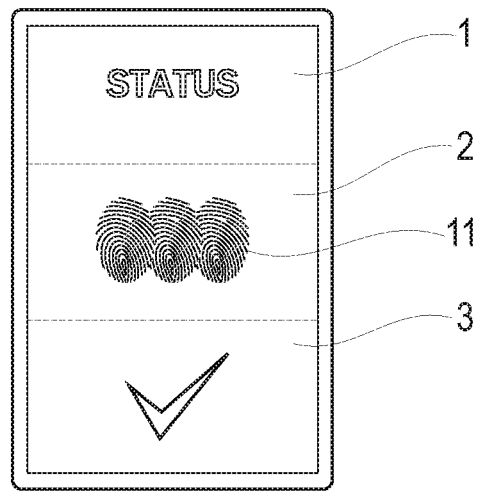
FIG. 12A is the embodiment of the invention according to FIG. 10a with another way of displaying results and end indicator of the roll procedure.
Figure 12B:
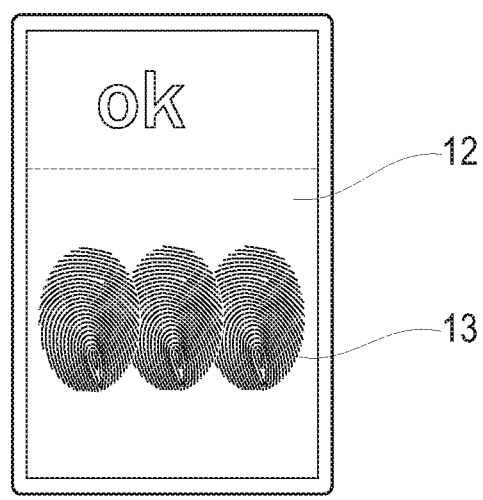
FIG. 12B is a further preferred embodiment form for the nail-to-nail roll procedure, wherein the display shows the results in high resolution and signals the end of the roll procedure.

As an alternative to the method described up to this point, a method of placing the finger 5 on one side of the finger in the roll area 3 and rolling the finger 5 to the other finger side is discussed in the following embodiment example. In this case, the finger 5 which is placed with the fleshy side in the center of the roll area 3 is first rolled on one finger side and then, proceeding from this position, to the opposite finger side. This process is illustrated in FIG. 10A to FIG. 12B. The starting position of the finger 5 in the center of the roll area 3, as is shown in FIG. 10A, is indicated by a position surface 17 or, as is shown in FIG. 10B, by the top view of a finger silhouette 15. Over the course of the roll process, it is first directed, as is shown in FIG. 11A, to roll the finger 5 from the center position into a side position and then, as is shown in FIG. 11B, to roll in the opposite direction over the center position, as is shown in FIG. 11C, into the opposite side position illustrated in FIG. 11D. The conclusion of the roll process can be made visible as shown in and as already described referring to FIG. 12A and FIG. 12B.

Error Handling and Correction Handling

Figure 17:
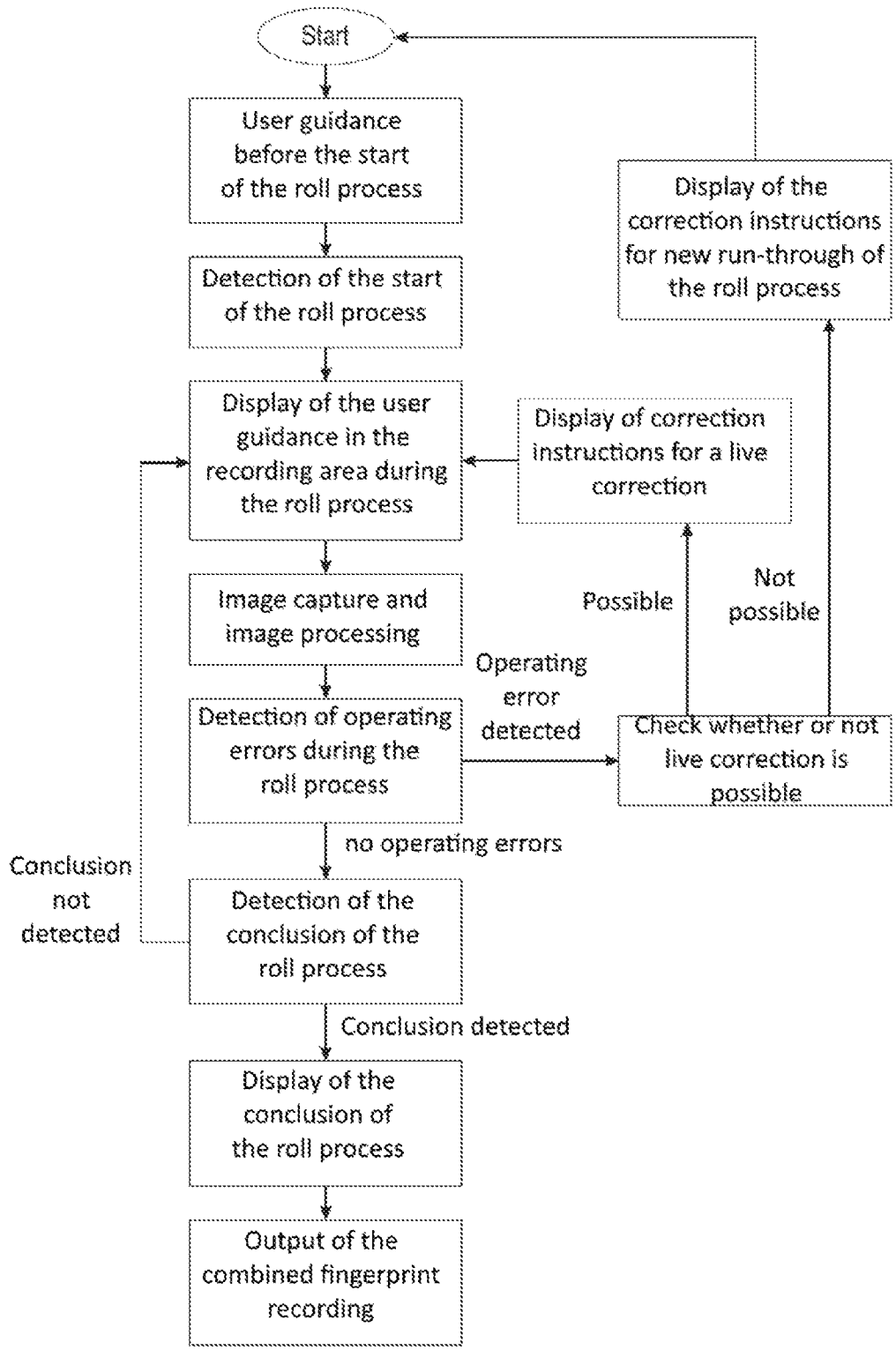
FIG. 17 is an expanded configuration of the method flow according to FIG. 16A in which operating errors during the roll process are detected and processed.

FIG. 17 shows the expanded flow from FIG. 16A which has been supplemented by a check for operating errors or problems during the recording which is carried out continuously within the rolling process. This checking is carried out within the rolling process described in FIG. 15 between the combining of the individual recordings to form a roll recording and the detection of the end of the rolling process. In this case, one or more of the individual recordings made last or of the fingerprint recordings put together last are checked. If no problems are shown or implied, the roll process continues as described referring to FIG. 15 and FIG. 16A. If problems are shown or implied in the checked recordings, checking is carried out in a further step as to whether this problem can still be counteracted through corrective measures while the roll process is running. If this is possible, the appropriate measures are indicated "live" during the ongoing roll process within the framework of user guidance in addition to or instead of the actual user guidance. If a live correction of this type is not possible, the detected problem and possible steps for preventing it are indicated and the entire recording process is restarted. In an alternative constructional variant, it is also possible to skip to an advanced point in the overall recording process instead of the beginning, e.g., for prompting to start with the rolling process, if the finger 5 is already lying on the sensor in the start position.

In an alternative constructional variant, the detection of and handling of problems that are detected in the generated recordings during the roll process can also be limited either to problems which can only be corrected during the roll process or only to problems requiring a restarting of the rolling process.

In an alternative constructional variant, checking for operating errors and problems during the image capture can also be carried out before the recordings captured up to that point have been put together to form a roll recording or even before the recording is actually generated in the current run-through of the recording loop of the rolling process. In this case, however, only correspondingly older recordings are available for the problem detection mentioned above.

Figure 18:
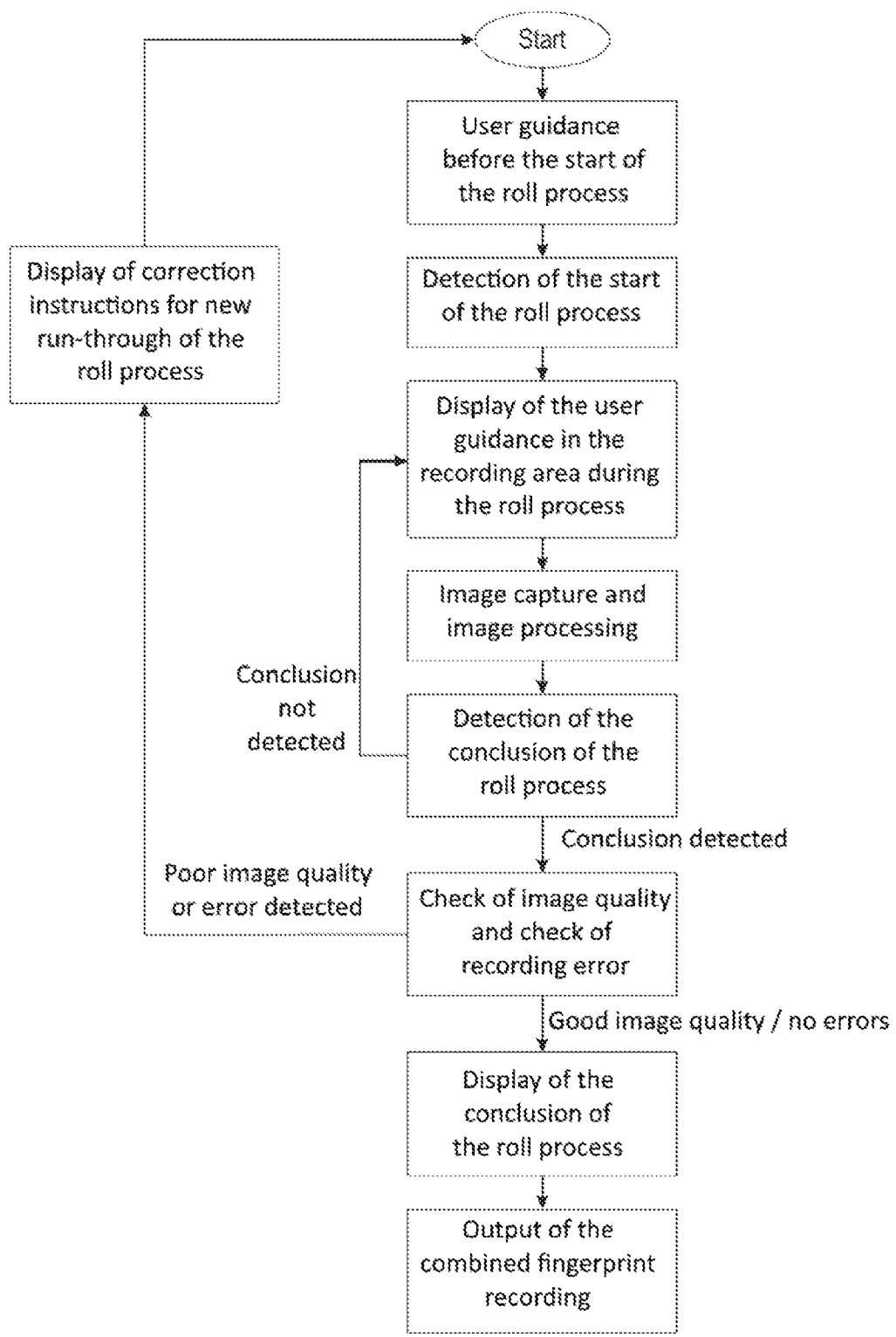
FIG. 18 is a further configuration of the method flow according to FIG. 16A in which the recording results of the roll process are checked and a repetition of the recording and, therefore, of the roll process is initiated when the recording quality is poor or if there are recording errors.

FIG. 18 shows the expanded flow from FIG. 16A which has been supplemented by a check of the completely combined roll recordings and possibly individual recordings used for this purpose after the rolling process has concluded. If a good recording quality has been determined and no recording problems have been noted, the process continues to run in the manner described referring to FIG. 15 or FIG. 16A and is successfully terminated. However, if a poor image quality or recording problems are detected during the above-mentioned check, the detected problem is indicated and, where appropriate, measures for preventing it are indicated and the entire recording process is restarted.

Figure 19:
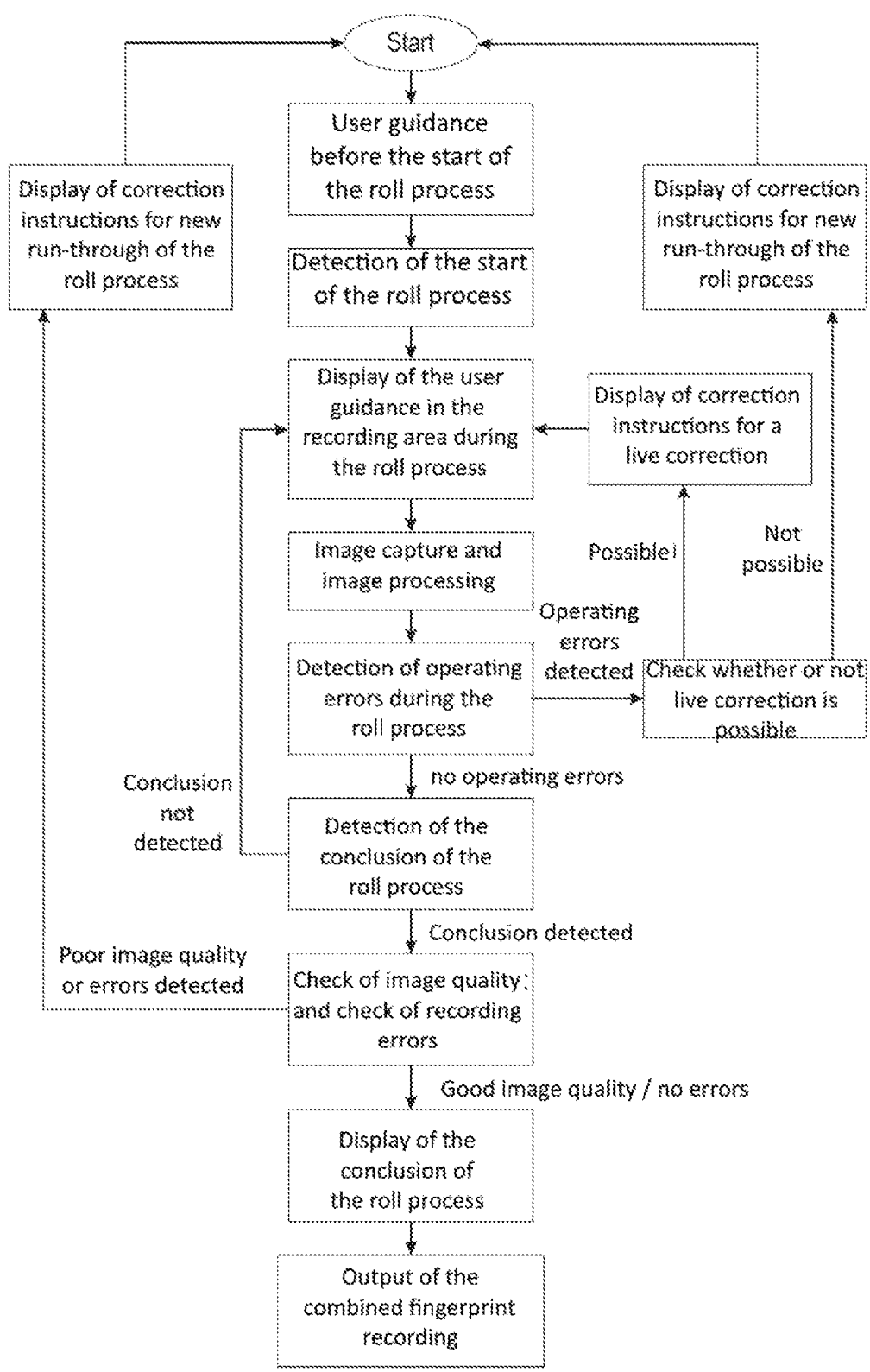
FIG. 19 is a further configuration of the method flow according to FIG. 16A with the error detection during the roll process shown in FIG. 17 and the checking of the recording results of the roll process shown in FIG. 18 combined with corresponding initiation of countermeasures whenever problems are detected.

FIG. 19 shows a combination of the flows from FIG. 17 and FIG. 18 and, for one, represents the basic flow described with reference to FIG. 15 for recording rolled fingerprints with a device which displays an interactive user guidance in the sensor area for carrying out the roll process. Further, FIG. 19 includes the expansion described with reference to FIG. 16A comprising an interactive user guidance for the process of placing the finger 5 before the start of the actual roll process and the expansion by which the conclusion of the roll process is displayed in the sensor area by graphics or animation after running through, and at the end of, the roll process. Analogous to FIG. 17 and FIG. 18, FIG. 19 further shows the detection and handling of problems during the roll process and the evaluation of recording quality and detection of recording problems at the conclusion of the roll process, and handling thereof.

Figure 13A:
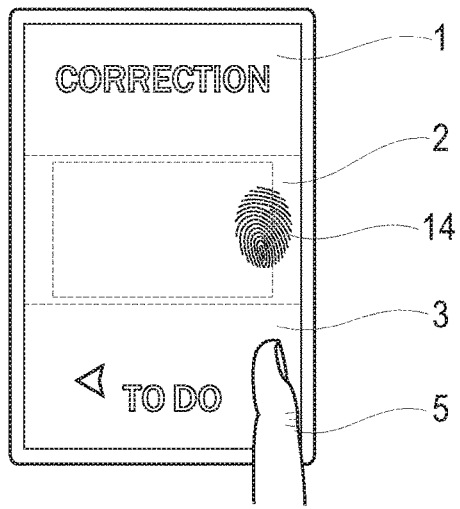
FIG. 13A is various error variants for the embodiment of the invention according to FIG. 4b during the recording of a rolled fingerprint and possible correction prompts during the roll procedure with incorrect edge position of the finger at the start.

FIG. 13A shows a typical error handling for an incorrect placement at the start of the roll process. In this case, the finger 5 is placed too far to the right at the edge. The user is instructed what to change by the instructions in the status area 1 and/or roll area 3. In this embodiment example, the finger 5 must be placed farther to the left in order to start the roll correctly. The indicator in the result area 2 shows a schematic or original representation of the fingerprint 11 and the incorrect position thereof, referred to here as "edge" error 14.

Figure 13B:
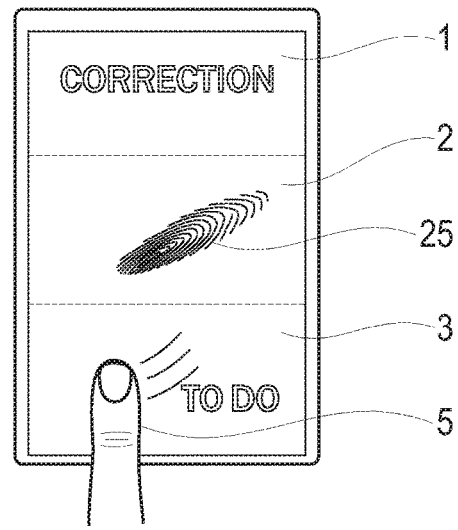
FIG. 13B is the embodiment of the invention according to FIG. 4b with an error variant for slippage of the finger during the rolling process.

FIG. 13B shows the slipping of a finger 5 in the result area 2 during the rolling in the roll area 3, designated here as "slip" error 25, and the indication of the required correction or the prompt to restart the rolling process in the status area 1 and roll area 3.

Figure 13C:
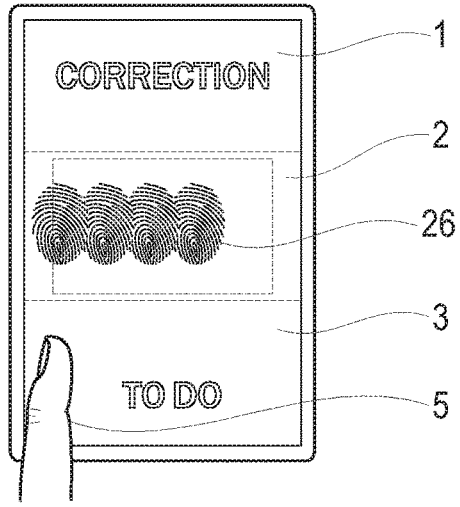
FIG. 13C is the embodiment of the invention according to FIG. 4b with an error variant for exiting the recording area during the rolling process.

FIG. 13C shows in the result area 2 the detection of a finger which is rolled too far beyond the maximum permissible width of the recording area for rolling, designated here as "too far" error 26, and the consequent prompt for correction in the status area 1 and/or in the roll area 3.

Figure 13D:
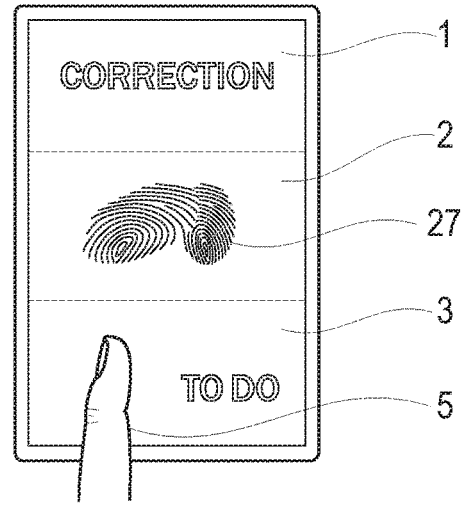
FIG. 13D is the embodiment of the invention according to FIG. 4b with an error variant for rolling the finger too fast or too slowly.

FIG. 13D shows the possibility of intervening during rolling when the finger 5 is rolled too quickly, designated here as "too fast" error 27. In this case, the user is called upon to adjust the rolling speed by correction prompts in the status area 1 and roll area 3. In this way, the user can adapt the execution speed in an optimal manner to achieve a successful roll process.

Figure 13E:
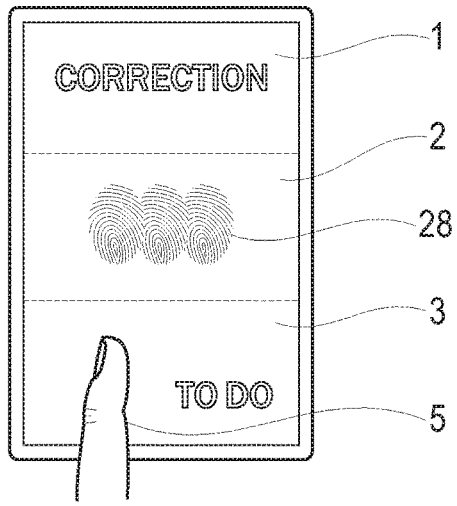
FIG. 13E is the embodiment of the invention according to FIG. 4b with an error variant for detection of an excessively dry finger.
Figure 13F:
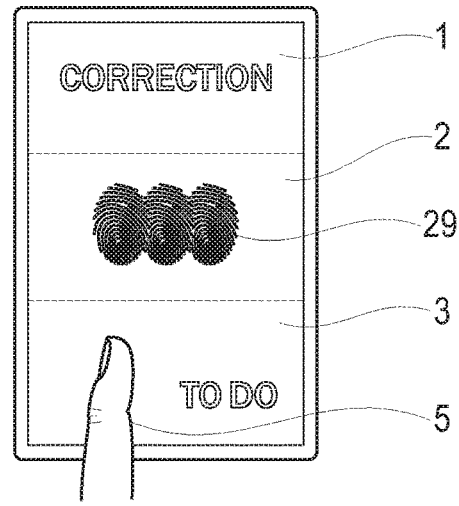
FIG. 13F is the embodiment of the invention according to FIG. 4b with an error variant for detection of an excessively moist finger.

FIG. 13E shows a finger 5 that is too dry, designated here as "too little pressure" error 28, and FIG. 13F shows a finger 5 which is too moist, designated here as "too much pressure" error 29. In this example, this display of the fingerprint 11 in the result area 2 can lead to a good estimation of the results. The need for a new recording is indicated in a status area 1 and roll area 3.

Figure 13G:
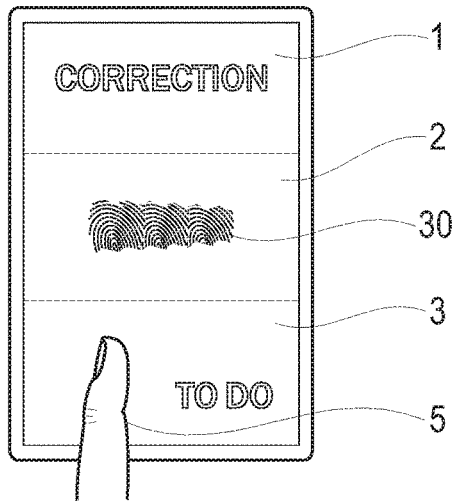
FIG. 13G is the embodiment of the invention according to FIG. 4b with an error variant for detection of a finger that is at least partially lifted during the rolling process.

FIG. 13G shows a finger 5 that is lifted during the rolling process, designated here as "incomplete" error 30. The image of the defective fingerprint 11 in the result area 2 is shown to illustrate the effect.

Figure 13H:
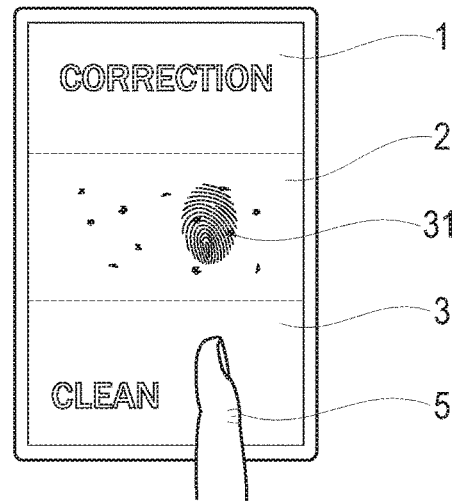
FIG. 13H is an example for a result display when the recording area is dirty with the prompt for cleaning.

FIG. 13H shows a dirty roll area 3, designated here as "dirty" error 31. The dirty image is shown in the result area 2. The image cannot be used for analysis. The required prompt to clean is shown here.

Figure 14:
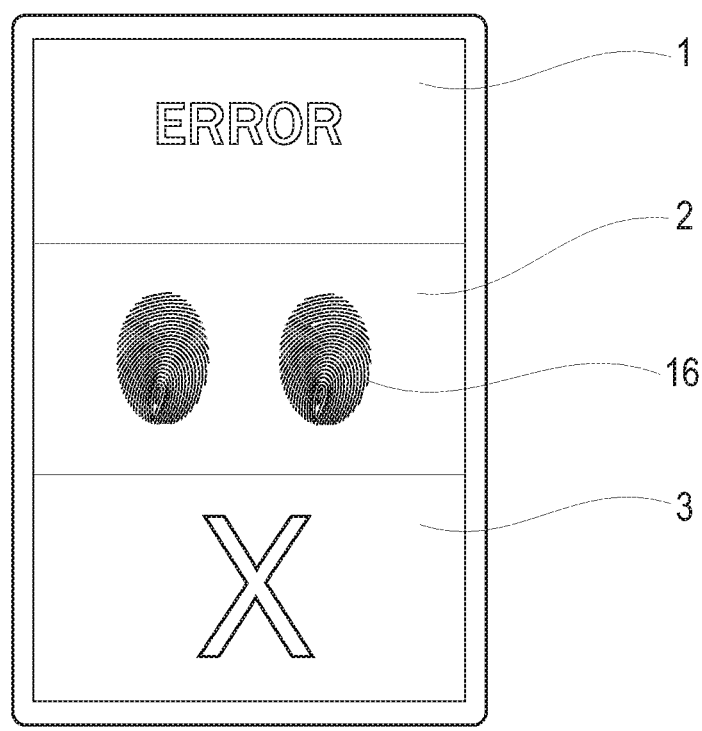
FIG. 14 is an example for a result display with negative outcome, wherein the display shows the incomplete result of the rolling process interactively.
Figure 23A:
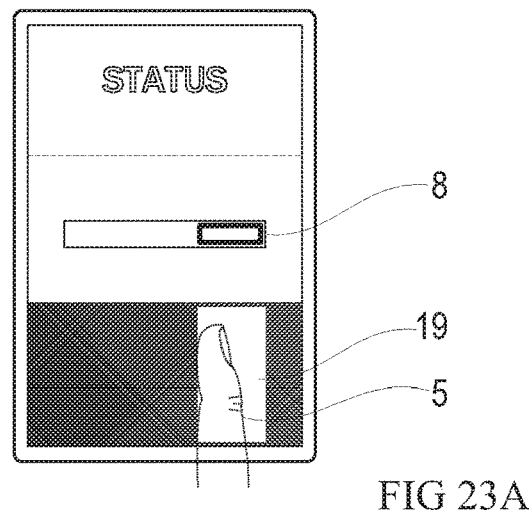
FIG. 23A is an embodiment example for an optical sensor in which the portion of the finger roll area on which the finger is located is homogeneously illuminated.

FIG. 14 shows an example of a result display with negative outcome of the fingerprint recording when partial prints could not be evaluated because of rolling errors, recording errors or other problems. In this regard, the display shows the incomplete result of the rolling process as defective result image 16 and displays an error message interactively, e.g., verbally with the word "error" and possibly also by symbols as a cross (in contrast to the checkmark shown in FIG. 12A). This would be followed by a handling instruction for starting the rolling movement in that, for example, according to FIG. 4B, a finger silhouette 10 is displayed together with the position line 4 and is moved laterally over the support surface. Handling prompts formed in other ways according to FIG. 13A et seq. or FIG. 23A et seq. can be used alternatively to repeat the recording of the rolling process.

Expanded Illumination Variants for Optical Sensor Systems

Figure 22:
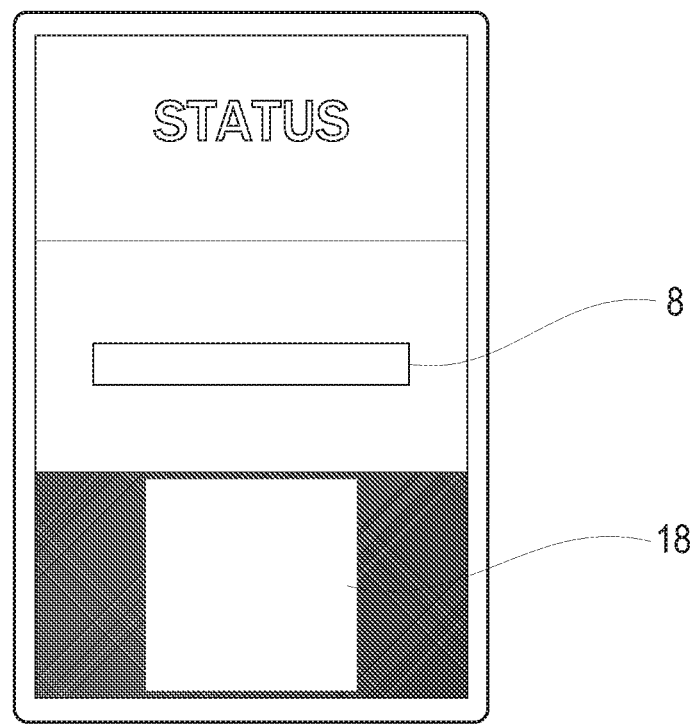
FIG. 22 is an embodiment example for an optical sensor in which the area on which the finger is to be rolled is illuminated homogeneously.
Figure 23B:
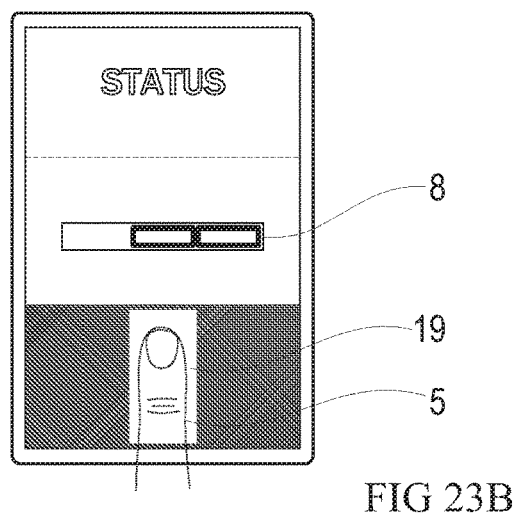
FIG. 23B is an embodiment example for an optical sensor in which the portion of the finger roll area on which the finger is located is homogeneously illuminated.
Figure 23C:
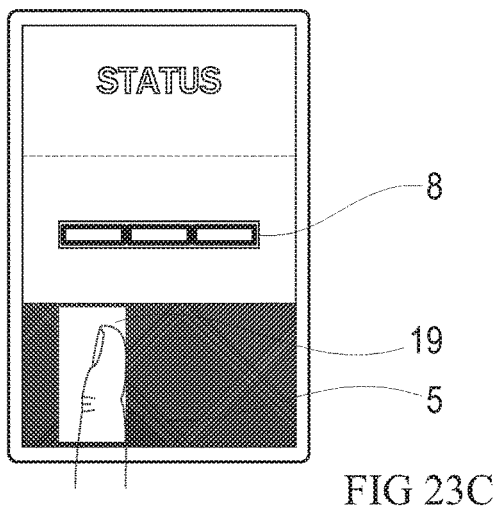
FIG. 23C is an embodiment example for an optical sensor in which the portion of the finger roll area on which the finger is located is homogeneously illuminated.

When using an optical sensor system to record fingerprints 11, the finger 5 or fingerprint areas must be illuminated so that an image thereof can be received by means of the optical sensor system. Ambient light, if present, is generally not sufficient to adequately illuminate all finger areas, particularly the middle areas resting on the sensor. Therefore, it is advantageous to make use of the display which is located within the sensor area and which can also be used for user guidance in order to illuminate the positioned finger 5 from the direction of the sensor system. If the entire roll area 3 need not be illuminated and utilized as is shown, e.g., in FIG. 4A, this can be carried out in a simple case by a homogeneous illumination of the portion of the roll area 3 over which the finger 5 can be rolled over the course of the roll process as is shown by the illuminated roll surface 18 in FIG. 22. The structured illumination unit used also makes it possible to illuminate only that area of the sensor on which the finger 5 is located at the current time within the recording process as is shown by the partially illuminated rolling surface 19 in FIG. 23A, FIG. 23B and FIG. 23C. Accordingly, for example, the boundaries of the area in which the finger 5 is currently anticipated can be rendered visible in a very precise manner.

Figure 20:
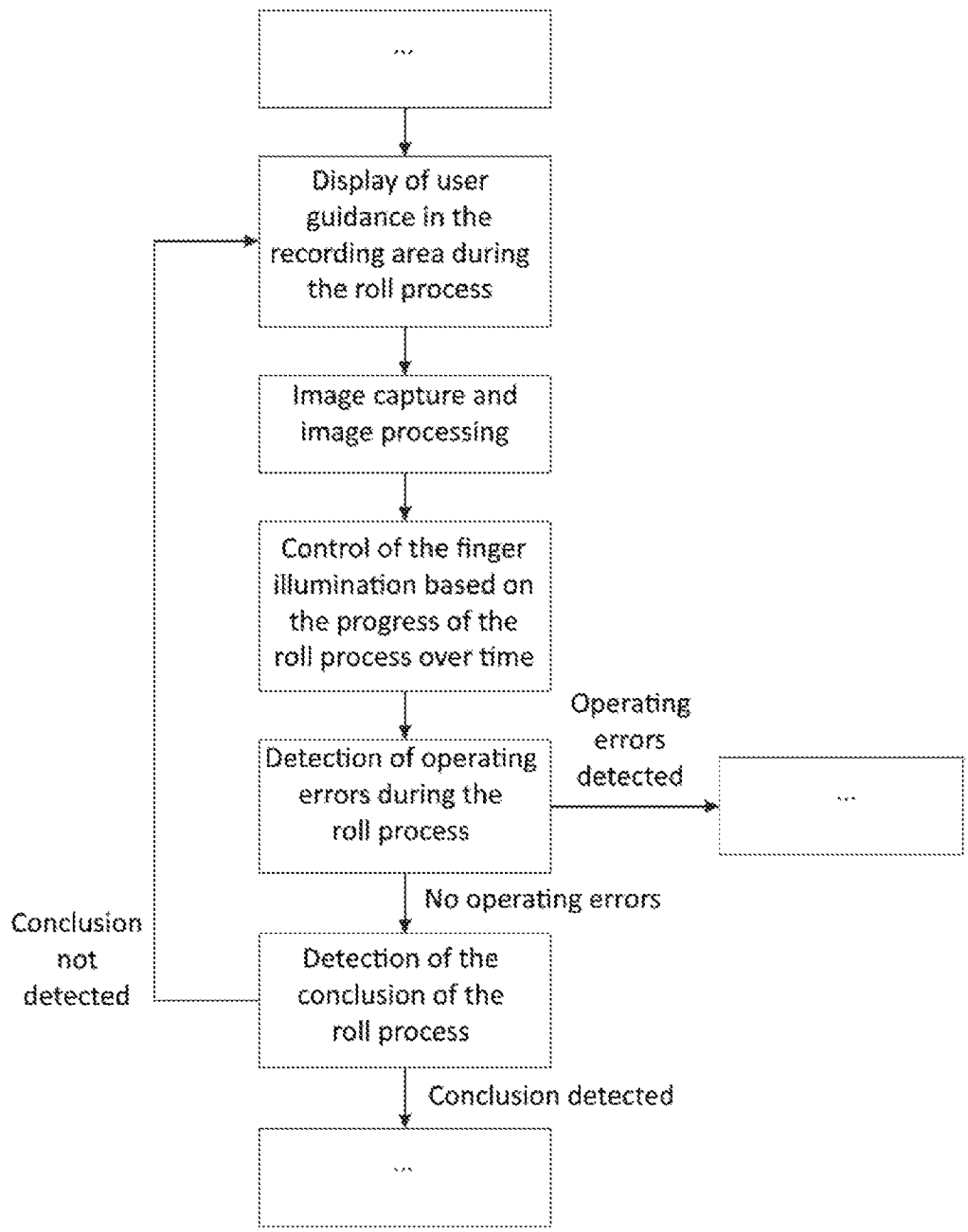
FIG. 20 is a further configuration of one of the method flows according to FIG. 15 to FIG. 19 with optical recording methods and additional dynamic illumination of the rolling finger after a fixed lapse of time.
Figure 24A:
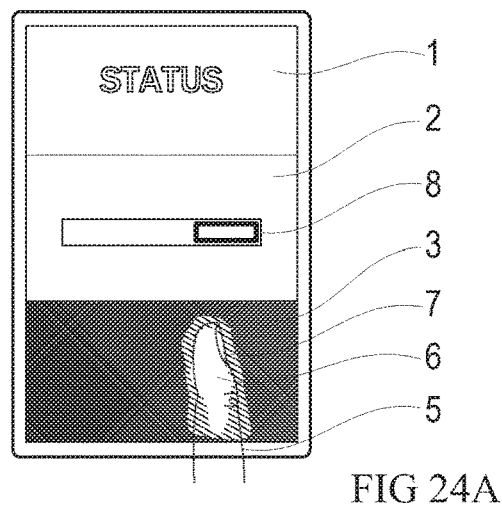
FIG. 24A is an embodiment example for an optical sensor in which the area on which the finger is placed is illuminated by a specific illumination pattern at every point in time during the rolling process.
Figure 24B:
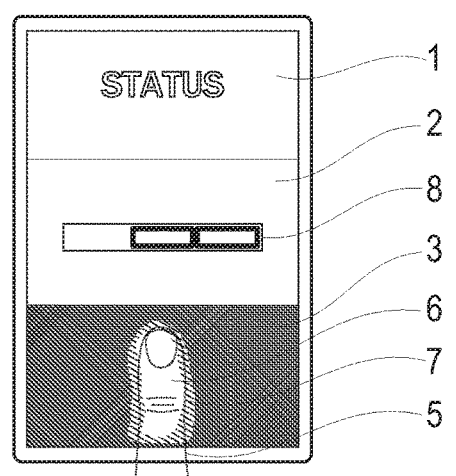
FIG. 24B is an embodiment example for an optical sensor in which the area on which the finger is placed is illuminated by a specific illumination pattern at every point in time during the rolling process.
Figure 24C:
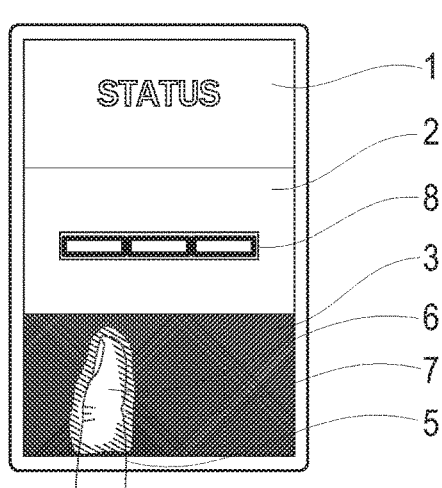
FIG. 24C is an embodiment example for an optical sensor in which the area on which the finger is placed is illuminated by a specific illumination pattern at every point in time during the rolling process.

Beyond this, to further improve the illumination conditions, the display as shown in FIG. 24A, FIG. 24B and FIG. 24C can be used for a structured illumination in the area in which the finger 5 is placed. Accordingly, e.g., in case of ambient light which penetrates the edges of the finger more than the middle areas and can accordingly ensure a saturation of the sensor together with the illumination by the display at the edges of the finger, the illumination pattern indicated by the display can be adapted correspondingly. This means that the illumination pattern can be generated in such a way that it is appreciably darker at the edges of the finger than in the center of the finger where ambient light hardly contributes to the illumination. Accordingly, sensor overdriving through ambient light at the edge of the finger or in case of one-sided ambient light illumination can be counteracted and a homogeneously, i.e., uniformly, illuminated fingerprint area can be achieved for the image capture. The positioning and determination of shape and brightness pattern of the illumination generated by the display can be carried out corresponding to the finger position predetermined by the fingerprint recording device as is shown in FIG. 20 based on assumptions regarding finger position, finger shape and illumination through ambient light. In a further embodiment example which will be discussed more fully referring to FIG. 21, the structured illumination can be adjusted based on the actually determined finger position, finger shape and finger illumination taking into account the ambient light.

FIG. 24A, FIG. 24B and FIG. 24C show an illumination pattern of this type which is darker at the edges of the finger 5 through brightness gradation dark 7 than in the middle of the finger 5 through brightness gradation bright 6. The illumination pattern can comprise few illumination values up to illumination curves, and the brightness curves can comprise a plurality of different shade values. In another embodiment example, the illumination pattern can also comprise a plurality of different illumination colors in addition to different shades.

FIG. 20 shows the process steps within the roll process recording loop from FIG. 17 and FIG. 19 supplemented by a finger illumination control based on the progress over time of the roll process. This finger illumination control controls the illumination of the device such that only a portion of the sensor area is illuminated and this illuminated portion within the sensor area can adopt any position, shape and illumination pattern. This possibility of selective illumination within the sensor area is used to additionally illuminate the finger 5 only partially, e.g., in order to compensate for influences of natural ambient light or sunlight. In FIG. 20, the flow of the roll process is fixed by the device. The finger illumination control is active after the display and updating of the user guidance within the roll process and before the image capture, and illumination is carried out precisely in that sensor area in which additional illumination of the finger 5 would be necessary based on the timed flow of the roll process.

The flow with finger illumination control shown in FIG. 20 is a general expansion of the roll image recording process with optical sensors. This expansion can be used both for roll image recordings with error handling in the recording loop as in FIG. 17 and FIG. 19 and for roll image recordings without this error handling. This is also made clear by the fact that an expansion of the basic flow for recording rolled fingerprints 11 which is shown in FIG. 15 is obtained when omitting the check for operating errors within the roll process shown in FIG. 20.

In a further embodiment example, the finger illumination control can also be carried out at a different point in the roll process recording loop because the expected location of the finger 5 to be illuminated at the recording times is clear at all times. Therefore, the illuminated area within the sensor surface area can be placed at the location where the finger 5 should be located for the next recording time at any time between the preceding image capture time and the subsequent image capture time.

Figure 21:
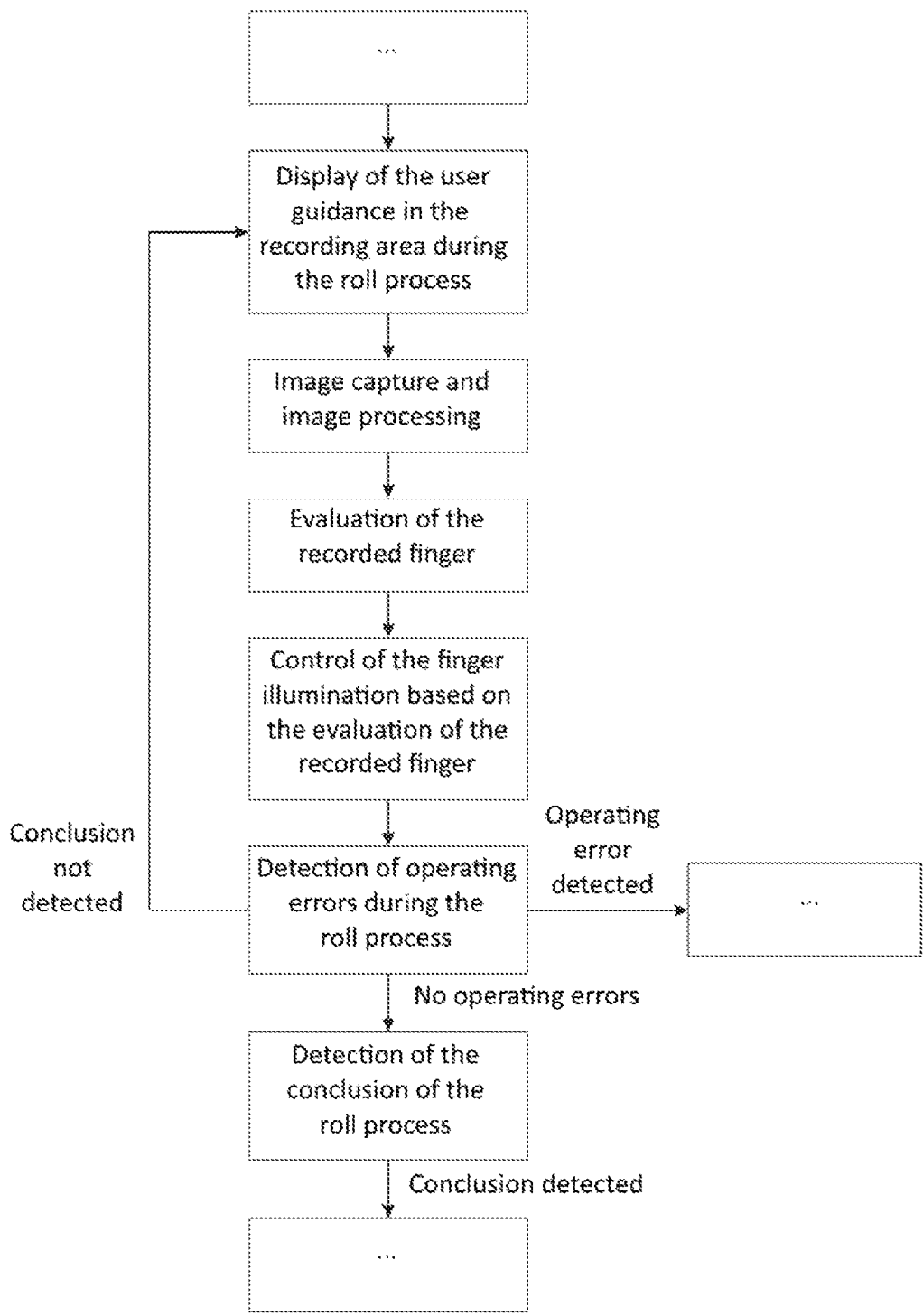
FIG. 21 is another configuration of one of the method flows according to FIG. 15 to FIG. 19 with optical recording methods and additional dynamic illumination of the rolling finger taking into account the current position, shape and illumination of the finger on the sensor.

FIG. 21 shows process steps within the roll process recording loop from FIG. 17 or FIG. 19 supplemented by a finger evaluation unit and a finger illumination control unit. The finger evaluation unit is an image processing unit which evaluates the position, shape and illumination distribution of the part of the finger 5 lying on the support surface 20 in at least one of the images last captured by the sensor and prepares the results for subsequent steps. The finger illumination control unit can control the illumination of the device such that only a portion of the sensor area is illuminated and this portion can be defined in any way with respect to position, shape and illumination pattern. With the position, shape and illumination distribution of the part of the finger 5 contacting the sensor surface which are determined by the finger evaluation unit at the respective recording time of the image last captured, the finger illumination control unit determines on the basis of the position, shape and illumination distribution and of the movement trajectory of the finger 5 determined from the preceding images the position of the illuminated area within the sensor surface area where the finger 5 will probably be located based on its movement at the next image capture time. Moreover, the shape of the illuminated area within the sensor surface area and the illumination pattern in this area can be adapted by means of the finger illumination control unit such that, together with the existing ambient light, a more uniform illumination of the supported finger area is achieved. In this way, the finger 5 can be selectively illuminated, e.g., to compensate for ambient light influences, even during a roll process in which the user rather than the device determines the speed and accordingly also the finger position. In the embodiment example shown in FIG. 21, the detection of finger position, finger shape and finger illumination distribution and the finger illumination control take place after the image capture and after the current image is added to the roll image. In other embodiment examples, they can also be carried out at different locations within the roll process recording loop.

The selective illumination in the sensor area governed by finger position by means of finger evaluation and finger illumination control can be used to adapt the position, shape and brightness distribution of the illumination exactly to the positioned finger 5 at the respective time during a rolling process in which the rolling movement is not defined for the user but rather the user can freely carry out this movement, e.g., with respect to rolling direction and rolling speed. Further, the selective illumination in the sensor area oriented to the finger position can be used by means of finger evaluation and finger illumination control so that when a finger position is predetermined by the device the illumination position can be aligned with the finger 5 more exactly than if a movement of the illuminated sensor area were predefined, since it must be assumed that there is always a certain deviation between a finger position predetermined by the device and a finger position implemented by the user.

Analogous to FIG. 20, the flow with finger evaluation unit and finger illumination control unit shown in FIG. 21 is also a general expansion of the roll image recording process with optical sensors. This expansion can be used for roll image recordings with error handling in the recording loop as in FIG. 17 and FIG. 19 as well as for roll image recordings without this error handling. Again, this is made clear by the fact that an expansion of the basic flow for recording rolled fingerprints 11 which is shown in FIG. 15 is obtained when omitting the check for operating errors within the roll process shown in FIG. 21.

LIST OF REFERENCE NUMERALS 1 status area
2 result area
3 roll area
4 position indicator
5 finger
6 brightness gradation bright
7 brightness gradation dark
8 progress indicator
9 frame
10 side finger silhouette
11 (put-together, rolled) fingerprint
12 large result area
13 result image
14 "edge" error
15 top view of a finger silhouette
16 defective result image
17 position surface area
18 illuminated roll surface
19 partially illuminated roll surface
20 support surface
21 protective layer
22 sensor layer
23 light source
24 light portions
25 "slip" error
26 "too far" error
27 "too fast" error
28 "too little pressure" error
29 "too much pressure" error
30 "incomplete" error
31 "dirty" error
32 additional light source (for illumination)

What is claimed is:

1. A device for direct recording of prints of a rolled finger, the device comprising;
   a layer body including a sensor layer having a two-dimensional matrix of sensor elements for detecting characteristic skin prints of the rolled finger, and a support surface on which the finger can be rolled, the support surface being disposed as an outer surface of the layer body in parallel and opposite the sensor layer at a distance from the sensor layer less than five times a mean distance between adjacent sensor elements;
   a light source provided as a two-dimensional display layer attached to the layer body, said light source comprising lighting elements that can be controlled individually or by groups to generate visible patterns for user information with spatial and temporal reference to the rolled finger by portions of light of the light source passing through the support surface, wherein the display layer is capable of changing patterns in a sequence of images at a refresh rate of at least one image per second; and
   an electronic control unit serving to communicate with the light source to control lighting elements along different areas of the support surface to generate a pattern which is variable over time with spatial and temporal reference to the rolled finger.

2. The device according to claim 1, wherein the sensor elements are sensitive to at least one of the following: capacitance, ohmic resistance, impedance, acoustic signals, temperature and light intensity.

3. The device according claim 1, wherein the lighting elements of the light source can be controlled such that displayed patterns can be changed at a refresh rate of between 10 and 30 images per second.

4. The device according to claim 1, wherein the distance between the sensor layer and the support surface is less than twice the mean distance between two adjacent sensor elements.

5. The device according to claim 1, wherein the sensor layer is configured such that a capture rate at which recordings of the rolled finger are read out can be set higher for a partial region of the support surface than for recordings over an entirety of the support surface.

6. The device according to claim 1, wherein the sensor elements are photo-sensitive and wherein the light source of the layer body is further configured such that an illumination pattern can be generated for homogenized illumination of the rolled finger and for minimizing influence of ambient light during recording of rolled fingerprints.

7. The device according to claim 6, wherein the light source of the layer body is configured to illuminate the rolled finger by light of a selected wavelength region for image capture of rolled fingerprints.

8. The device according to claim 1, wherein the sensor elements are photo-sensitive, and further comprising an additional light source for illuminating the rolled finger with light of a desired wavelength region, the additional light source generating an illumination pattern for homogenized illumination of the rolled finger and for minimizing influence of ambient light during recording of rolled fingerprints by areas of the additional light source which are controllable individually or in groups.

9. The device according to claim 8, wherein the light source and the additional light source are configured as liquid crystal displays, light emitting diode displays, electroluminescent displays or quantum dot displays.

10. The device according to claim 9, wherein the electronic control unit is connected to the sensor layer and has a computing unit for calculating an adapted inhomogeneous illumination pattern for illuminating the rolled finger and wherein the electronic control unit further communicates with the light source or the additional light source which are controllable individually or in groups, for controlling areas of the light source and the additional light source to illuminate the rolled finger in accordance with the adapted inhomogeneous illumination pattern.

11. A method for direct recording of prints of a rolled finger using a device with a layer body, the device comprising a sensor layer for detecting characteristic skin prints of the rolled finger and a support surface on which the finger can be rolled, the support surface being disposed as an outer surface of the layer body in parallel and opposite the sensor layer, and a light source provided as a two-dimensional display layer comprising lighting elements that can be controlled individually or by groups to generate visible patterns for user information with spatial and temporal reference to the rolled finger by portions of light of the light source through the support surface, the method comprising:
- positioning the finger of a user on the support surface;
- displaying a handling instruction as a visible pattern for user information in at least one area of the support surface by controlling the lighting elements of the light source, the lighting elements being controllable individually or in groups;
- displaying further handling instructions as an image sequence changed with spatial and temporal reference to the rolled finger by the display layer capable of changing the image sequence at a refresh rate of at least one image per second to direct a user to carry out a rolling movement of the finger on the support surface;
- carrying out a rolling movement of the finger of the user on the support surface in accordance with the handling instruction and further handling instructions that are displayed as the image sequence changing with a refresh rate of at least one image per second and with spatial and temporal reference to the rolled finger; and
- outputting sensor data of the rolling movement and storing the sensor data successively outputted from the sensor layer as fingerprint recordings sensed at the support surface in a spatially progressive manner.

12. The method according to claim 11, wherein the positioning of the finger is preceded by displaying the handling instruction and the further handling instructions for accurate positioning and orientation of the finger on the support surface by controlling the lighting elements of the light source which are controllable individually or in groups.

13. The method according to claim 11, further comprising displaying results of the rolling movement of the finger on the support surface.

14. The method according to claim 13, further comprising displaying the results of the rolling movement as a current sensor recording, as a put-together fingerprint or as an abstracted fingerprint.

15. The method according to claim 11, further comprising specifying a desired speed of the rolling movement of the finger during a rolling process through the image sequence as a moving fingerprint pattern for user information directly on the support surface.

16. The method according to claim 11, further comprising recognizing a rolling direction selected by the user and facilitating the rolling movement by an adapted display of an animation of the rolling movement as a moving fingerprint pattern for user information.

17. The device according to claim 1, further comprising carrying out specific image processing for generating a characteristic print image of the rolled finger from the recordings successively generated through the sensor layer by using at least one of the following:
- using redundant fingerprint information from overlapping image areas of the successively generated recordings to reduce noise;
- selecting a least blurry or otherwise distorted fingerprint information from the successively generated recordings for further processing;
- superimposing and transforming areas with fingerprint information from the successively generated recordings based on discovered match features;
- adding areas of fingerprint information during the rolling process after a recording generated for a first time via a cumulation of the successively generated recordings;
- adding areas of fingerprint information during the rolling process after a recording generated for the first time via a cumulation of the successively generated recordings; and
- replacing existing areas with fingerprint information of the successively generated recordings when higher-quality recordings of a same area of fingerprint information are detected.

18. The method according to claim 11, further comprising analyzing the recordings successively generated by the sensor layer during the rolling process for rolling errors and displaying the handling instructions as visible patterns on the support surface when errors or quality criteria which have not been met are detected.

19. The method according to claim 11, further comprising controlling the light source or the additional light source for illuminating the rolled finger individually or in groups such that the rolled finger, for an optical recording through a photosensitive sensor layer, is illuminated with an adapted inhomogeneous illumination pattern to minimize an influence of ambient light and to generate a homogenized illumination of the rolled finger.

* * * * *